(12) United States Patent
Nguyen

(10) Patent No.: US 7,914,287 B2
(45) Date of Patent: *Mar. 29, 2011

(54) SYSTEM AND METHOD OF TEACHING AND LEARNING MATHEMATICS

(76) Inventor: Huong Nguyen, Seattle, WA (US)

( * ) Notice: Subject to any disclaimer, the term of this patent is extended or adjusted under 35 U.S.C. 154(b) by 531 days.

This patent is subject to a terminal disclaimer.

(21) Appl. No.: 11/955,315

(22) Filed: Dec. 12, 2007

(65) Prior Publication Data

US 2008/0090213 A1 Apr. 17, 2008

Related U.S. Application Data

(63) Continuation-in-part of application No. 11/381,964, filed on May 5, 2006, now Pat. No. 7,309,233.

(60) Provisional application No. 60/678,048, filed on May 5, 2005.

(51) Int. Cl.
*G09B 19/02* (2006.01)
(52) U.S. Cl. ....................................... 434/204
(58) Field of Classification Search ............... 434/188, 434/190, 194, 195, 200, 203, 204; 446/85, 446/105, 117, 118
See application file for complete search history.

(56) References Cited

U.S. PATENT DOCUMENTS

| | | | |
|---|---|---|---|
| 1,329,850 A | 2/1920 | Pye | |
| 1,471,437 A | 10/1923 | Wood | |
| 2,014,675 A | 9/1935 | Webster | |
| 2,486,260 A | 10/1949 | Church | |
| 2,494,469 A | 1/1950 | Booth | |
| 2,564,976 A | 8/1951 | Hooper | |
| 2,899,757 A | 8/1959 | Webb | |
| 3,430,363 A | 3/1969 | Gala | |
| 3,503,832 A | 3/1970 | Umminger | |
| 3,708,892 A | 1/1973 | Graf | |
| 3,793,470 A | 2/1974 | Christy et al. | |
| 3,811,205 A | 5/1974 | Pitzler | |
| 4,211,029 A | 7/1980 | Cretin | |
| 4,485,585 A | 12/1984 | Shackelford et al. | |
| 4,509,920 A | 4/1985 | Kaufmann | |
| 4,820,234 A | 4/1989 | Isaf | |
| 6,758,675 B2 | 7/2004 | Karabaic | |
| 6,769,914 B2 | 8/2004 | Sundararajan | |
| 6,926,530 B2 | 8/2005 | Frieman | |
| 7,014,468 B1 | 3/2006 | Thorpe | |
| 7,077,654 B2 | 7/2006 | Burtness | |
| 7,309,233 B2 * | 12/2007 | Nguyen | 434/204 |

* cited by examiner

*Primary Examiner* — Kurt Fernstrom
(74) *Attorney, Agent, or Firm* — Black Lowe & Graham PLLC

(57) ABSTRACT

Numero Cubes and the Whole Number System are disclosed. In one embodiment, the system may comprise cubes, pegs, magnets, dividers, shafts, and a number placement panel. The shafts may comprise individual marks representing the base ten number system. The system may provide a method of learning mathematics through a cognitively authentic learning experience in constructing and building numbers.

9 Claims, 26 Drawing Sheets

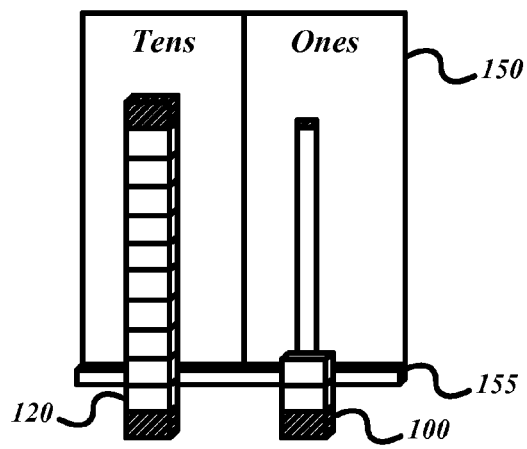
Fig. 18A
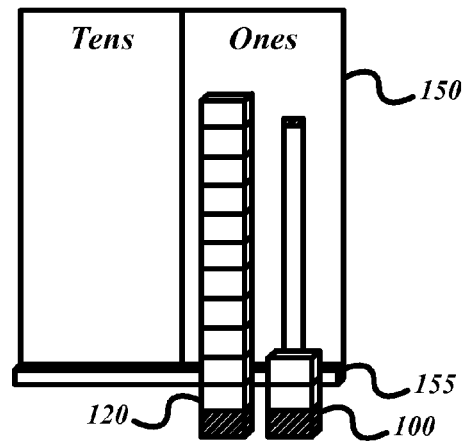
Fig. 18B
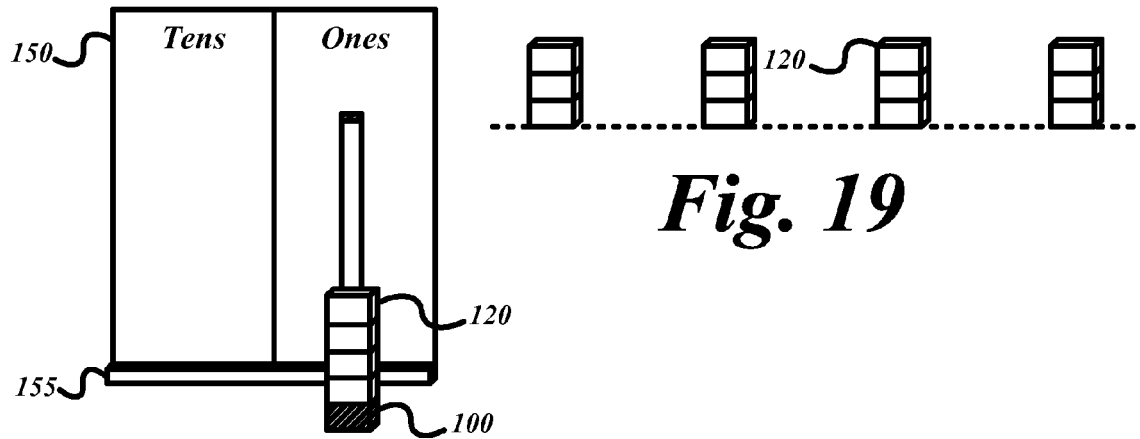
Fig. 18C
Fig. 19

*Top View*

*Side section view Along A-A line*

*Bottom View*

Section View

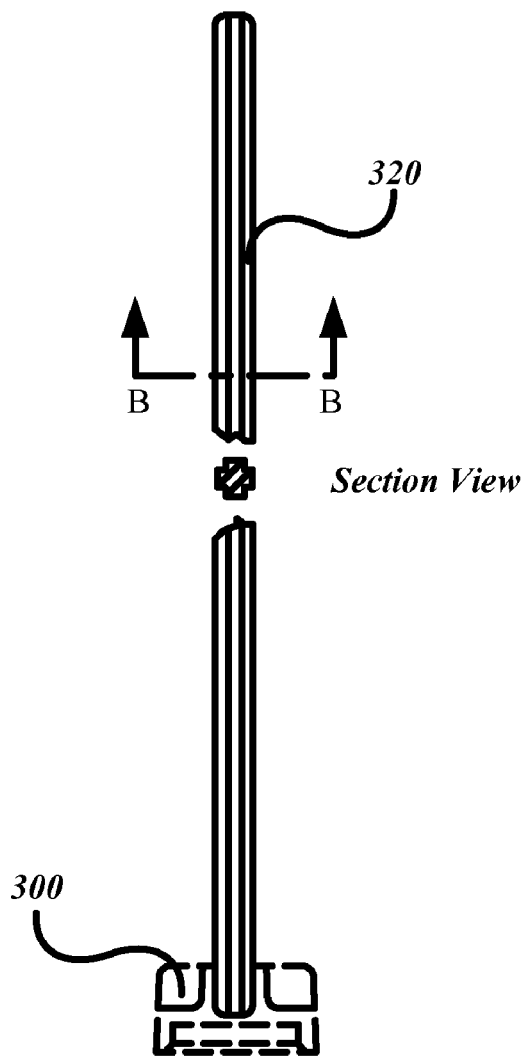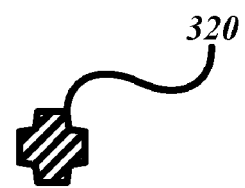
Fig. 26A                    Fig. 26B

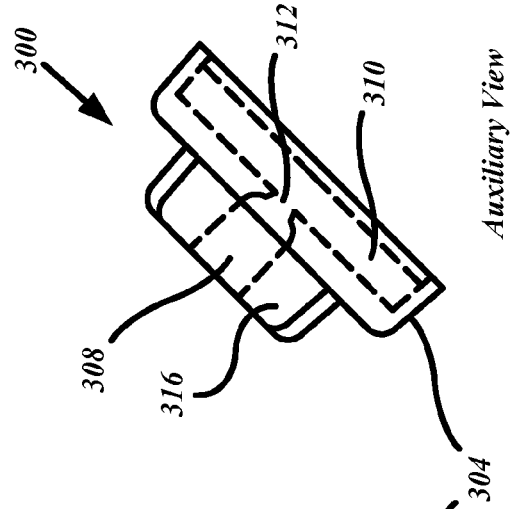
*Fig. 27D*
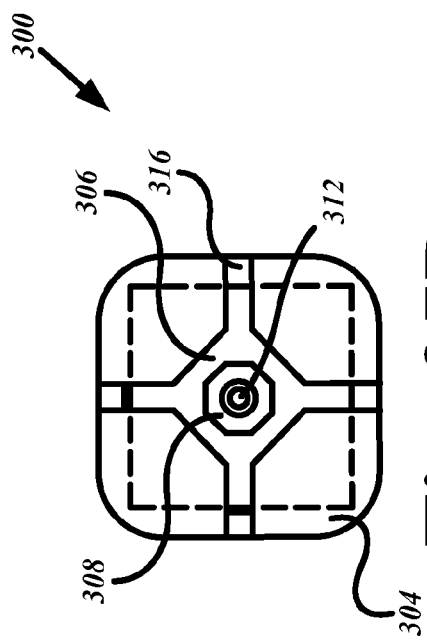
*Fig. 27B*
*Fig. 27C*
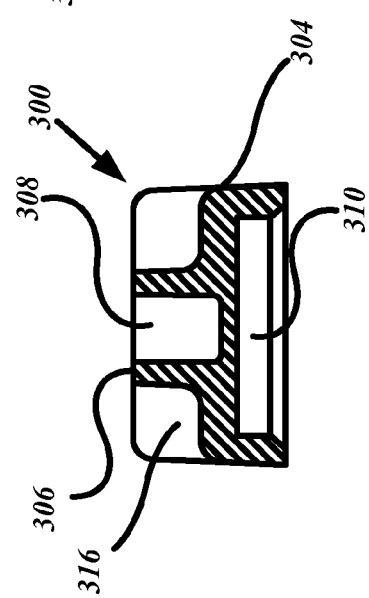
*Fig. 27A*

Fig. 28
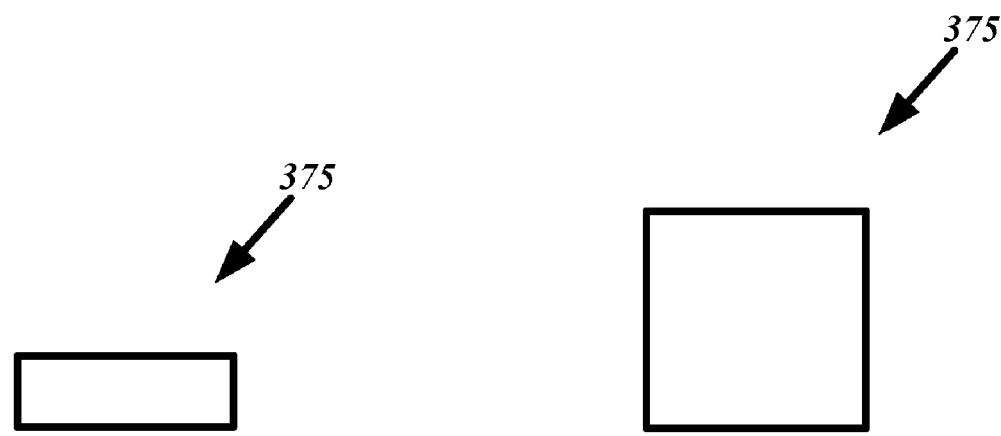
Fig. 29A     Fig. 29B

Section C-C

SYSTEM AND METHOD OF TEACHING AND LEARNING MATHEMATICS

CROSS REFERENCE TO RELATED APPLICATIONS

This application is a continuation-in-part of and claims priority to U.S. patent application Ser. No. 11/381,964 filed May 5, 2006, now U.S. Pat. No. 7,309,233 that in turn claims priority to and incorporates by reference in its entirety U.S. Provisional Application No. 60/678,048 filed May 5, 2005.

COPYRIGHT NOTICE

This disclosure is protected under United States and International Copyright Laws. © 2005 Huong Nguyen. All Rights Reserved. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a method of teaching mathematics, and in particular, to a method of teaching mathematics using visual aids.

BACKGROUND OF THE INVENTION

Current methods of teaching mathematics using manipulatives may not be effective in providing a concrete, simple, and in-depth learning experience that promotes a successful rate of learning among school children. Using the typical manipulative techniques, students may have problems recognizing numbers, constructing numbers, adding, subtracting, etc. The explaining process frequently is so complicated that children get lost and may not remember the process the next time they are asked to recall the information. Because children have to rely heavily on memorized mathematical facts and road map memorization, their performance on annual academic tests have been relatively low. Currently, the United States is ranked $42^{nd}$ amongst the world in mathematics.

Generally, traditional teaching methods do not provide stimulating and engaging experiences in learning mathematical concepts.

SUMMARY OF THE INVENTION

A method of teaching mathematics using the Numero Cubes and/or Whole Number System is disclosed. In one embodiment, the invention provides an effective and logical solution to teaching mathematics. Students become engaged and active thinkers in the process of seeking out solutions to their given challenging math problems. In one particular embodiment, the Math Logic teaching method may promote self-esteem, resiliency, and teamwork.

In another embodiment, the invention utilizes the base 10 number system. Students may touch, examine, count, compare numbers, develop mathematical patterns, add, multiply, divide, and/or perform simple fractions visually. Students may actively engage in concrete and sequential learning experiences that help them retain information in their short- and long-term memory. Students may think, analyze, evaluate, and construct their solutions to given challenging math problems. The Numero Cubes and/or Whole Number system may offer visual tools to help students accomplish mathematical goals and learning objectives. For example, students may be asked to analyze the number one hundred. In one embodiment, one hundred may be assembled from 10 ten units using two rectangular bars of magnets. These magnets may hold the 10 ten units together. Students may collaborate to create a one hundred unit or may work independently. This may provide an integration of math (i.e. the numbers) and science (i.e. the magnets) and students may learn how science can be used to solve a math problem.

In another embodiment, the invention may permit students to build and/or take apart their creation. For example in subtraction, students may be asked to remove a number of cubes from a peg. The answer to the subtraction problem is what remains on the peg. In another embodiment, students may remove the top peg off of 1 ten unit to have 10 individual cubes when they need to borrow 1 ten. Students may also remove the magnetic bars to have 10 tens when they need to borrow 1 hundred. Therefore, learning may become a visual and/or logical task.

BRIEF DESCRIPTION OF THE DRAWINGS

FIGS. 5-23C illustrate the present invention, according to different embodiments;

FIG. 26A-B illustrates side, and top views of alternate embodiments of the peg and peg base;

FIG. 27A-D illustrates additional views of the peg base;

FIG. 28 illustrates a magnet insert for the numero cube base;

FIGS. 29A-B illustrates side and top views of the iron insert for the peg base;

DETAILED DESCRIPTION OF THE PREFERRED EMBODIMENT

Figure 1A:
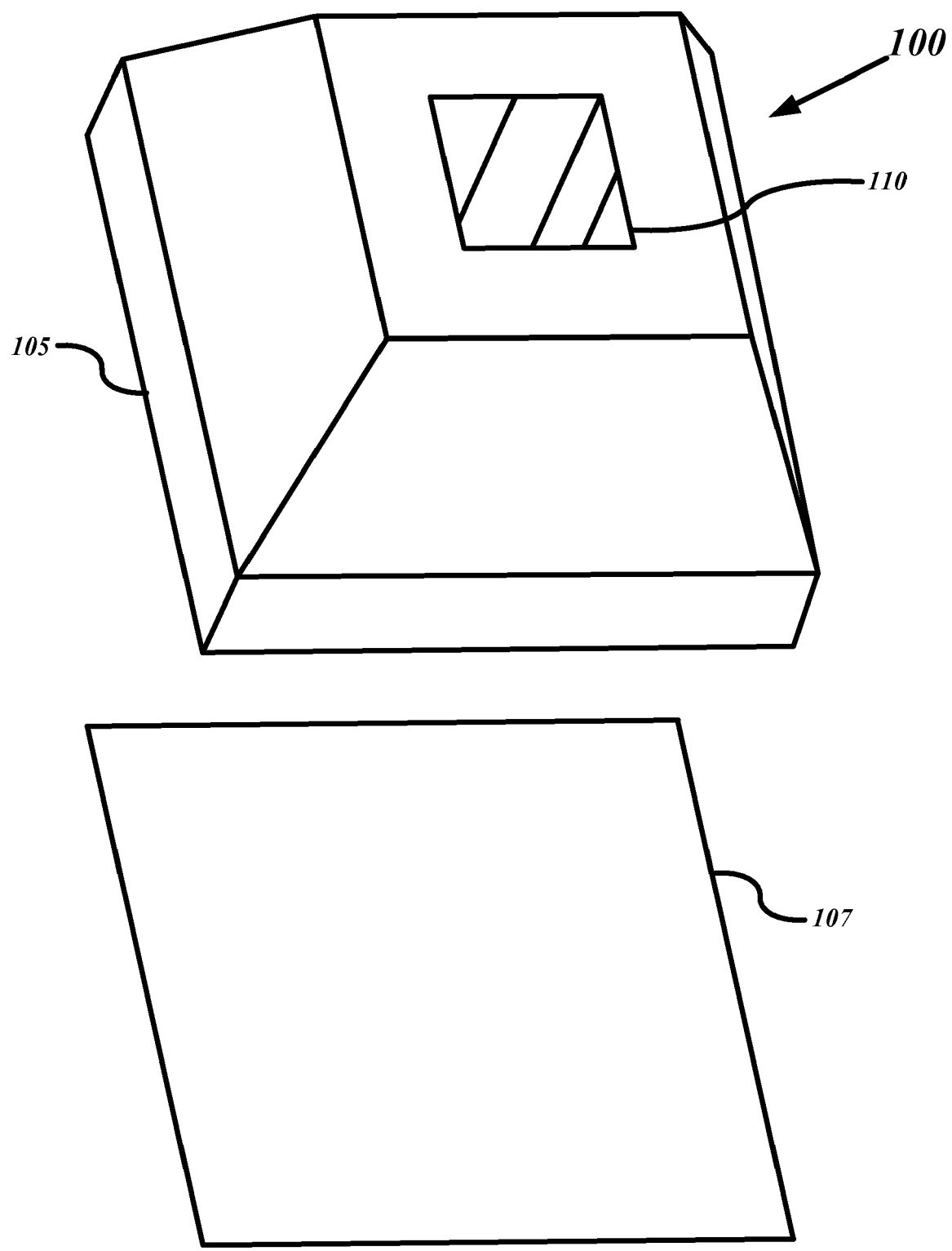
FIGS. 1A-1G show various components of one embodiment of the present invention.
Figure 1B:
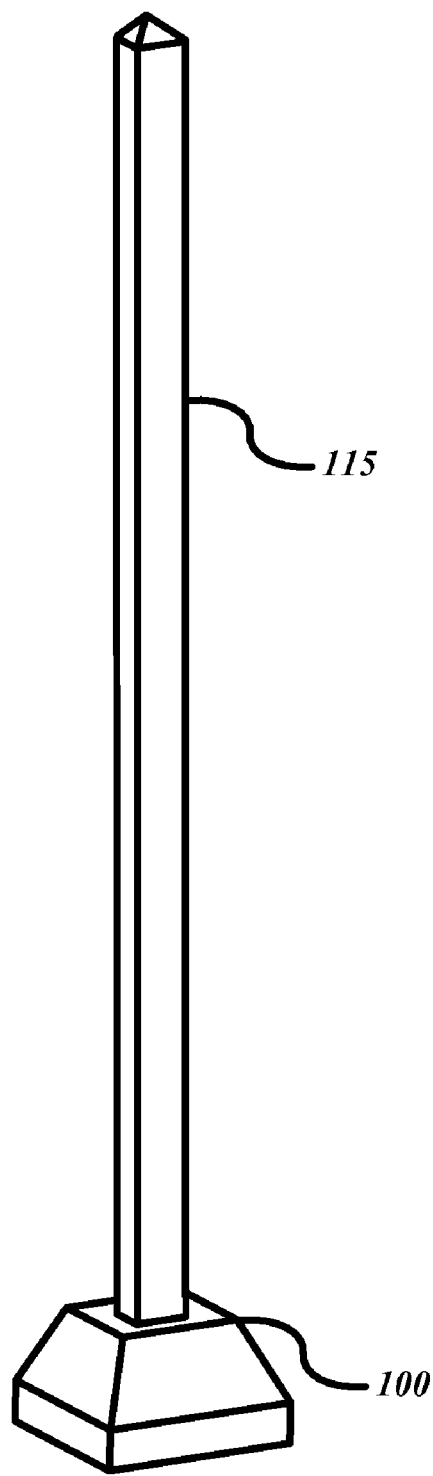
Figure 1C:
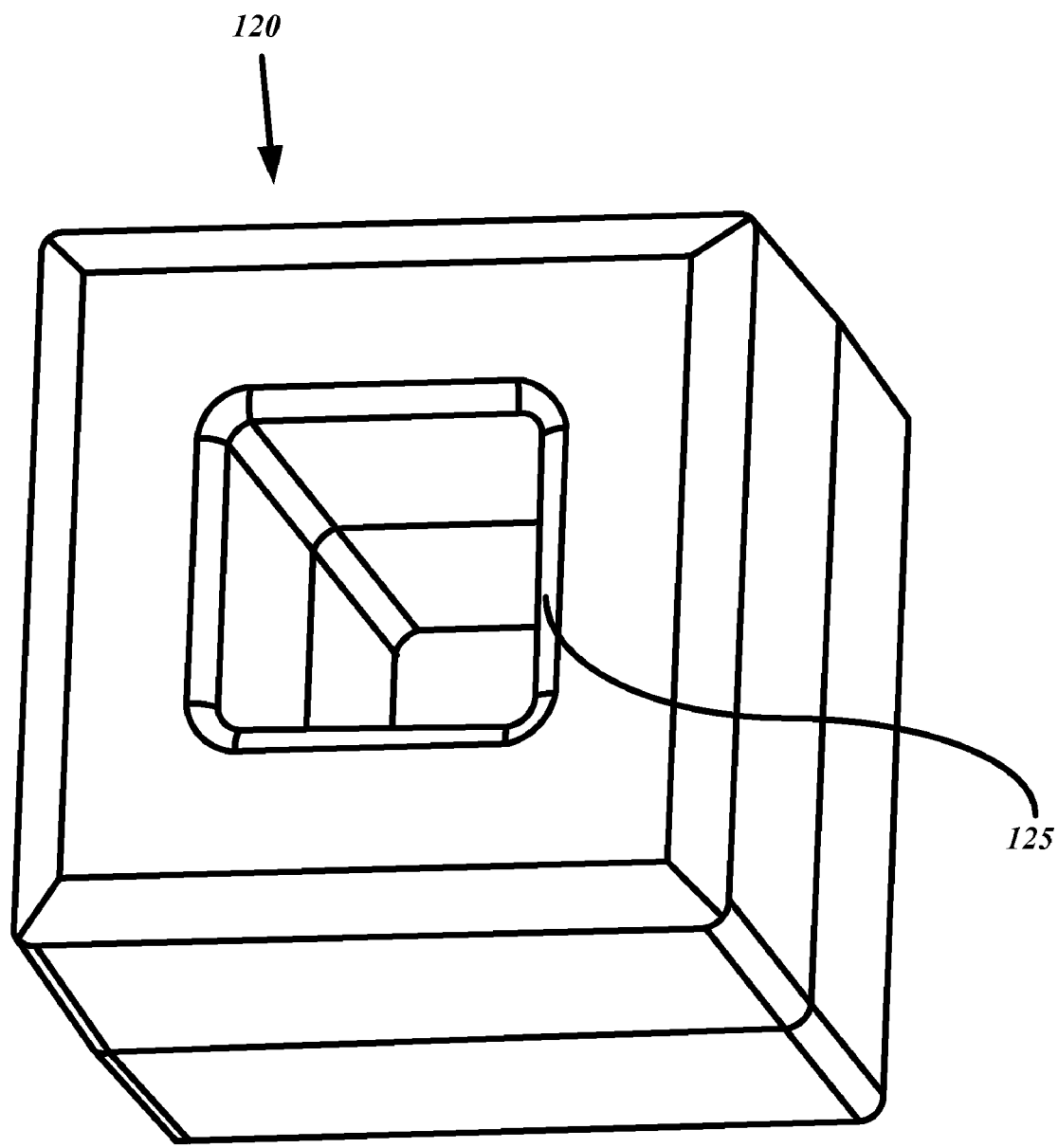
Figure 1D:
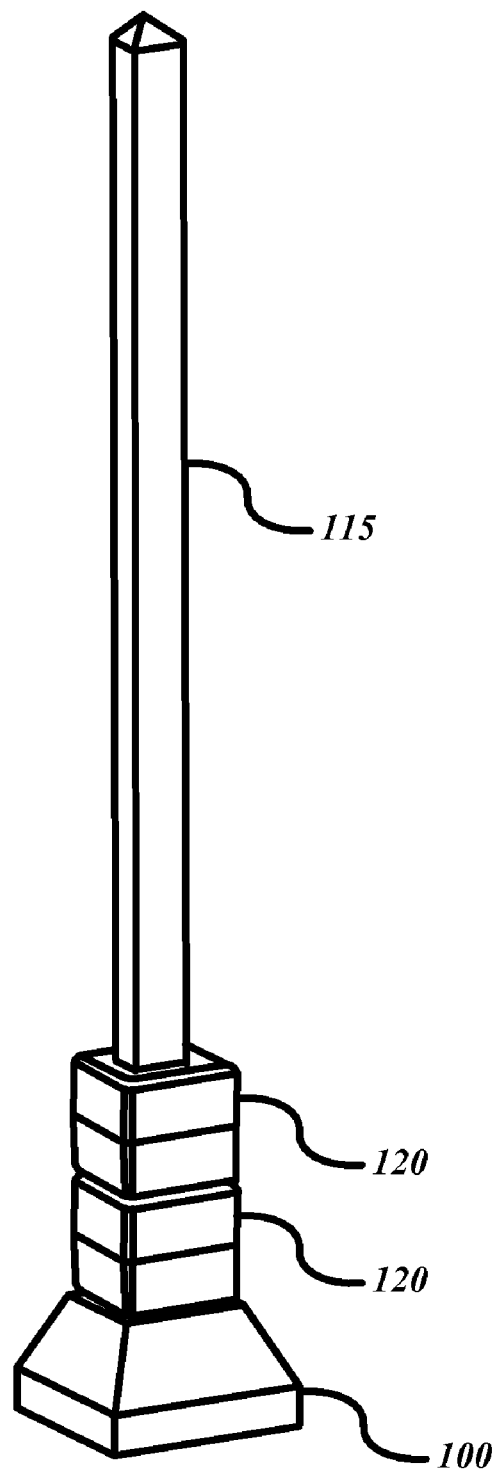
Figure 1E:
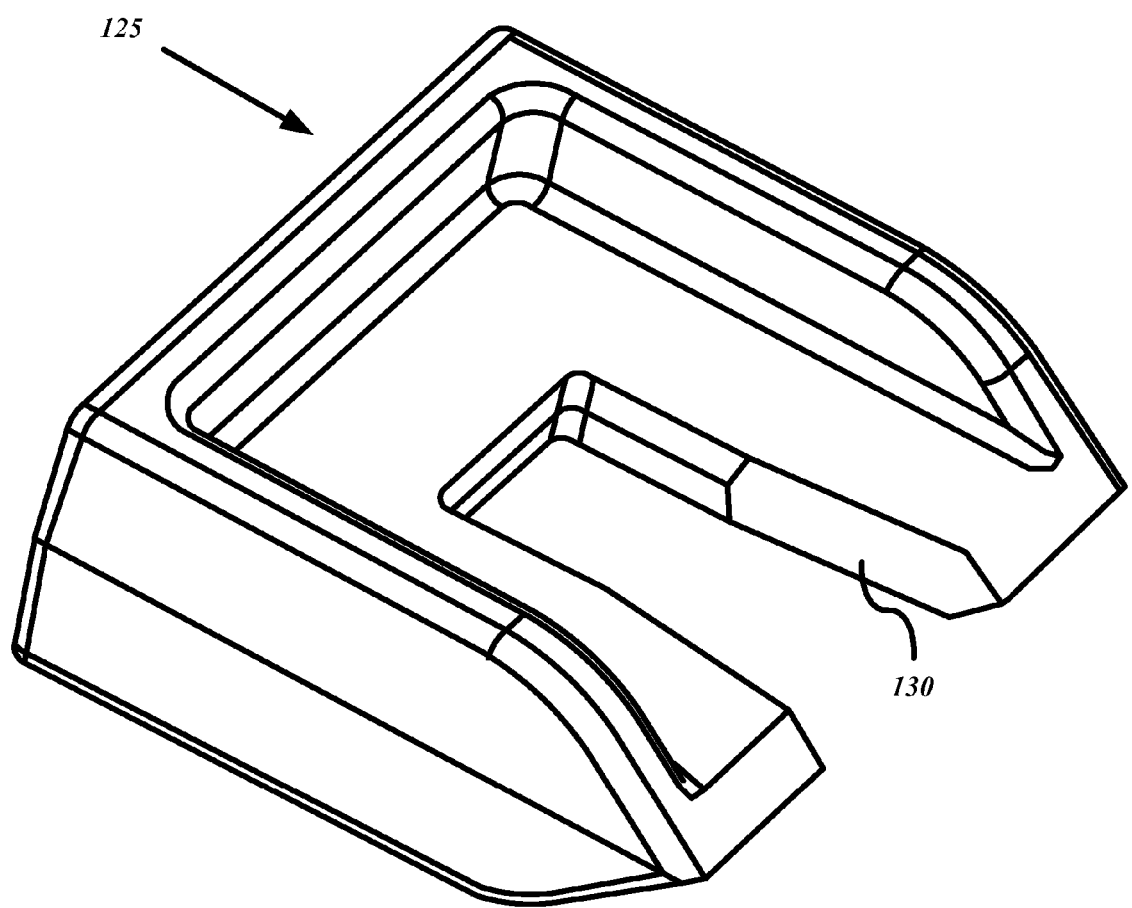
Figure 1F:
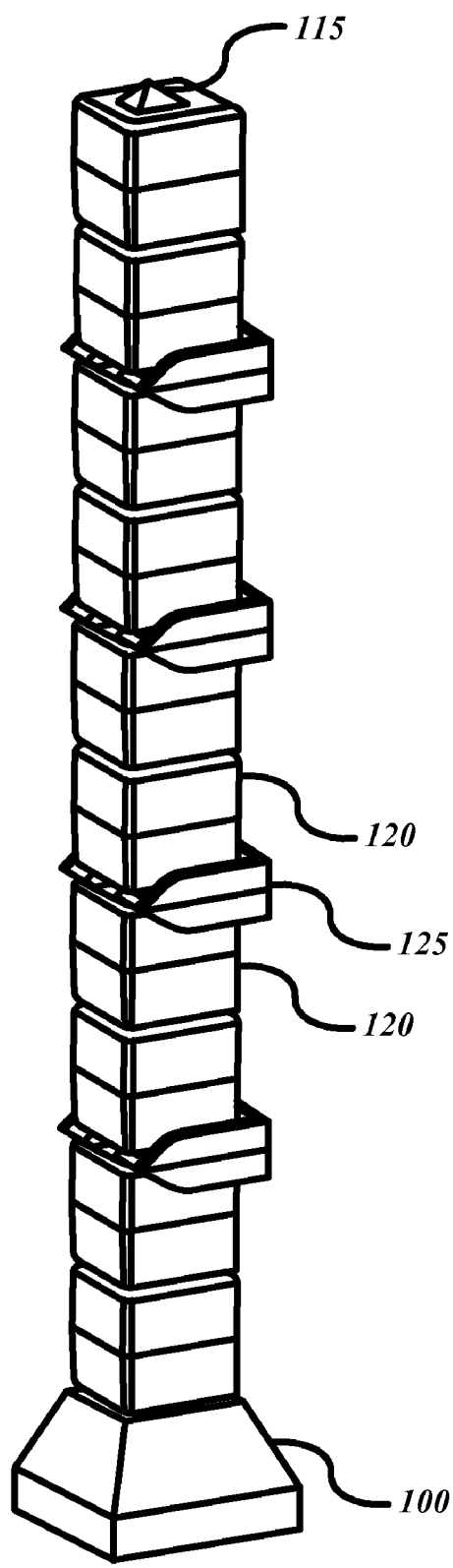
Figure 1G:
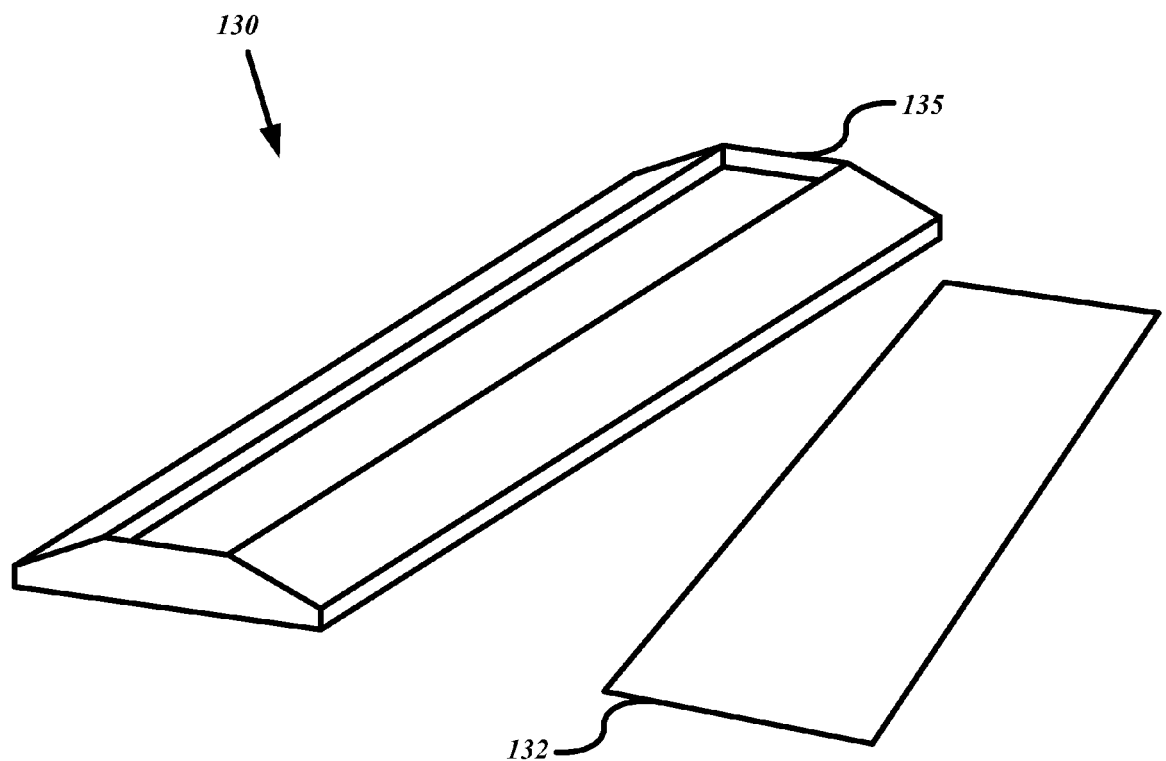

FIGS. 1A-1G shows various components of one embodiment of the present invention. FIG. 1A shows a peg 100 which includes a base 105 and a shaft receptacle 110. The base 105 may include a magnet, for example a magnetic plate 107 attached to the bottom of the base 105. FIG. 1B shows the peg 100 of FIG. 1A with an attached shaft 115. The shaft 115 may be inserted into the shaft receptacle 110 and held in place by friction, or by various attachment means such as nails or screws (not shown). The shaft 115 may include marks 117 (FIG. 15) corresponding inscribed on the shaft. FIG. 1C shows a cube 120. The cube 120 defines a sleeve 125 of a size and/or shape that allows insertion of the shaft 115 into the sleeve 125 and allows the sleeve 125 to freely slide along the length of the shaft 115. FIG. 1D shows a peg 100 with attached shaft 115 and a pair of cubes 120 inserted onto the shaft 115. FIG. 1E shows a divider 125 defining an open slot 130. The slot 130 is sized to accept a shaft 115 when the divider 125 is placed between cubes 120 on a shaft 115, as shown in FIG. 1F. FIG. 1G shows a tray 130 defining a peg receptacle 135 sized to allow pegs 100 to be placed in the receptacle 135. In one embodiment, ten pegs 100 may fit in the receptacle 135. The tray 130 may include a magnet, for example a magnetic plate 132 attached to the bottom of the tray 130.

Figure 2A:
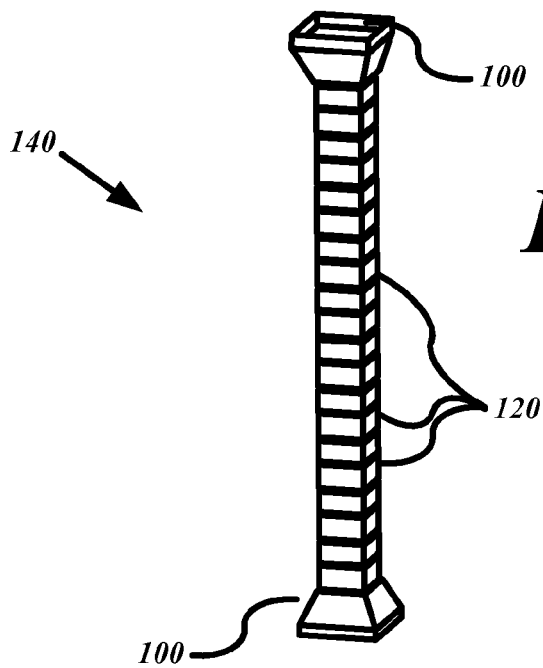
FIGS. 2A and 2B show an assembled ten unit and an assembled one hundred unit with tray, respectively, of an embodiment of the present invention.
Figure 2B:
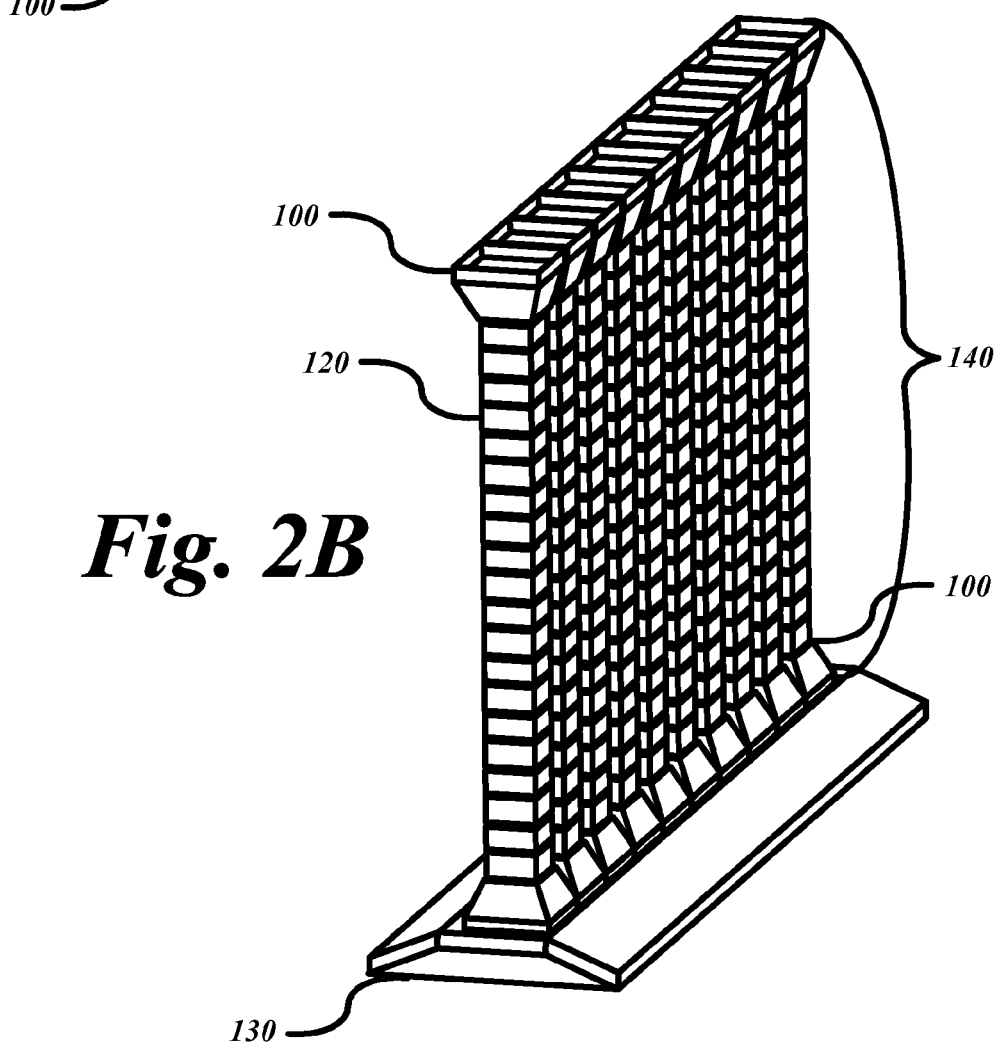

FIG. 2A shows an assembled ten unit 140. The unit 140 includes a shaft (not shown) with ten cubes 120 and a peg 100 attached to each end of the shaft 115, the pegs 100 attached securely enough to prevent the cubes 120 from slipping off of the shaft 115. FIG. 2B shows an assembled hundred unit 145 made up of ten units 140. The unit 145 includes ten shafts 115, each with 10 cubes 120 and two pegs 100 attached. One end of each shaft 115 with attached peg 100 is placed in the tray 130. The magnetic plate 132 of the tray 130 may act with the magnetic plate 107 of each peg 100 to exert an attractive force between the tray 130 and the pegs 100. This configuration may aid in manipulation of the unit 145 and/or prevent the unit 145 from falling apart.

Figure 3:
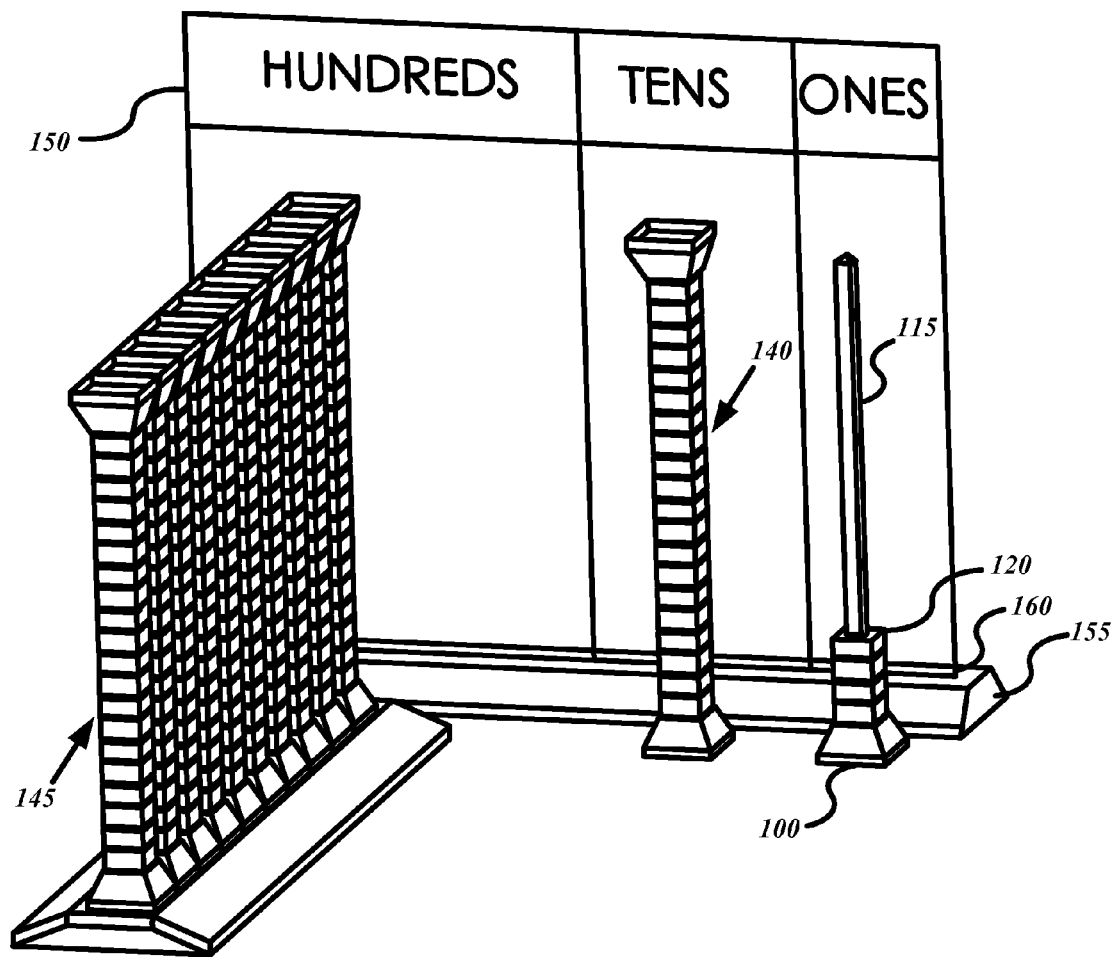
FIG. 3 shows an embodiment of a Numero Placement Panel of the present invention.

FIG. 3 shows an assembled hundred unit 145, an assembled ten unit 140, a peg 100 and shaft 115 with two cubes 120, and a placement panel 150 and a panel tray 155 defining a panel slot 160. The panel 150 may be a translucent sheet of plastic sized to fit in the panel slot 160. The panel 150 may include a marked hundreds section 152, a tens section 154, and a ones section 156. The panel 150 may provide a concrete image as to why the number 100 is written as 1 with two consecutive 0.

Math Logic comprises an inductive teaching method that may provide students (not shown) with a learning tool to learn mathematics successfully and effectively using cubes 120, pegs 100, placement panel 150, and/or dividers 125. One will appreciate however, that other suitable embodiments of the invention may vary the sizes and/or shapes of the individual components. For example, the pegs 100 may comprise other digit holders, including fasteners and/or security devices such as pins and/or plugs. The pegs 100 may further comprise adhesive or attractive patches or plates, such as magnets and/or Velcro®. In other embodiments, the cubes 120 may comprise any suitable geometric shape, including cube-shaped, rectangular and/or cylindrical.

In another embodiment, students may be able to compare numbers and/or predict a pattern of numbers. This may allow students to perform addition and/or subtraction. Students may be engaged in authentic learning experiences through constructing, building, analyzing, and/or evaluating their processes in finding solutions to challenging and difficult math problems. Generally, young children's' textbooks and counting books introduce the number 1 as the first number, not zero. In one embodiment of the present invention, zero is the first number of the whole number system. Under the typical method of learning, children may not understand the concept of the number 0 and may not comprehend what zero means as a place holder in numbers such as 10, 100, 1000, etc.

Figure 4:
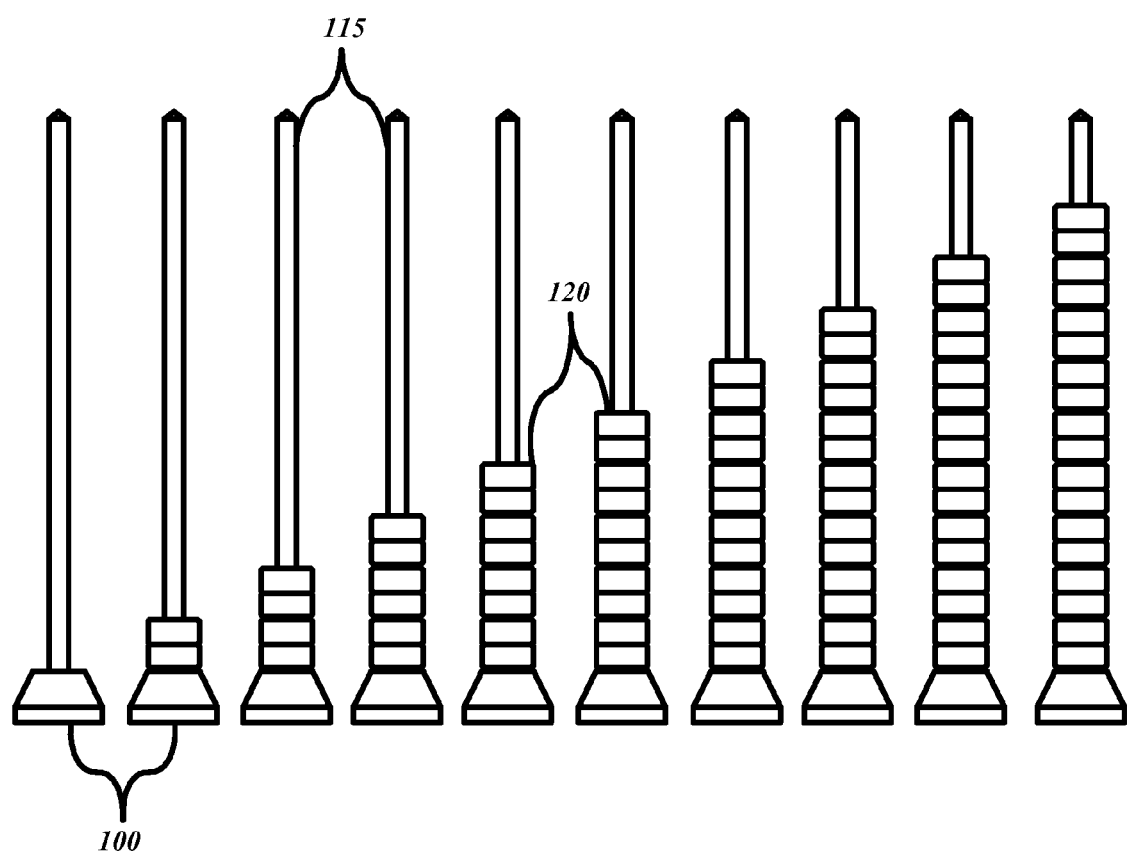
FIG. 4 shows the first 10 whole numbers represented by an embodiment of the present invention.

An embodiment of the present invention may show students and young children the importance of the number zero. In one embodiment, zero is the first number of the base 10 whole number system. The peg 100 may be black and each cube 120 white, although any suitably contrasting colors may be applied. Where there is no cube 120 placed on the peg 100, children may clearly visualize the number zero. In one embodiment, zero indicates that there is no cube on the peg. In another embodiment, the base 10 number system comprises 10 basic numbers, 0, 1, 2, 3, 4, 5, 6, 7, 8, and 9. FIG. 4 shows these basic ten numbers represented by an embodiment of the present invention.

Figure 5:
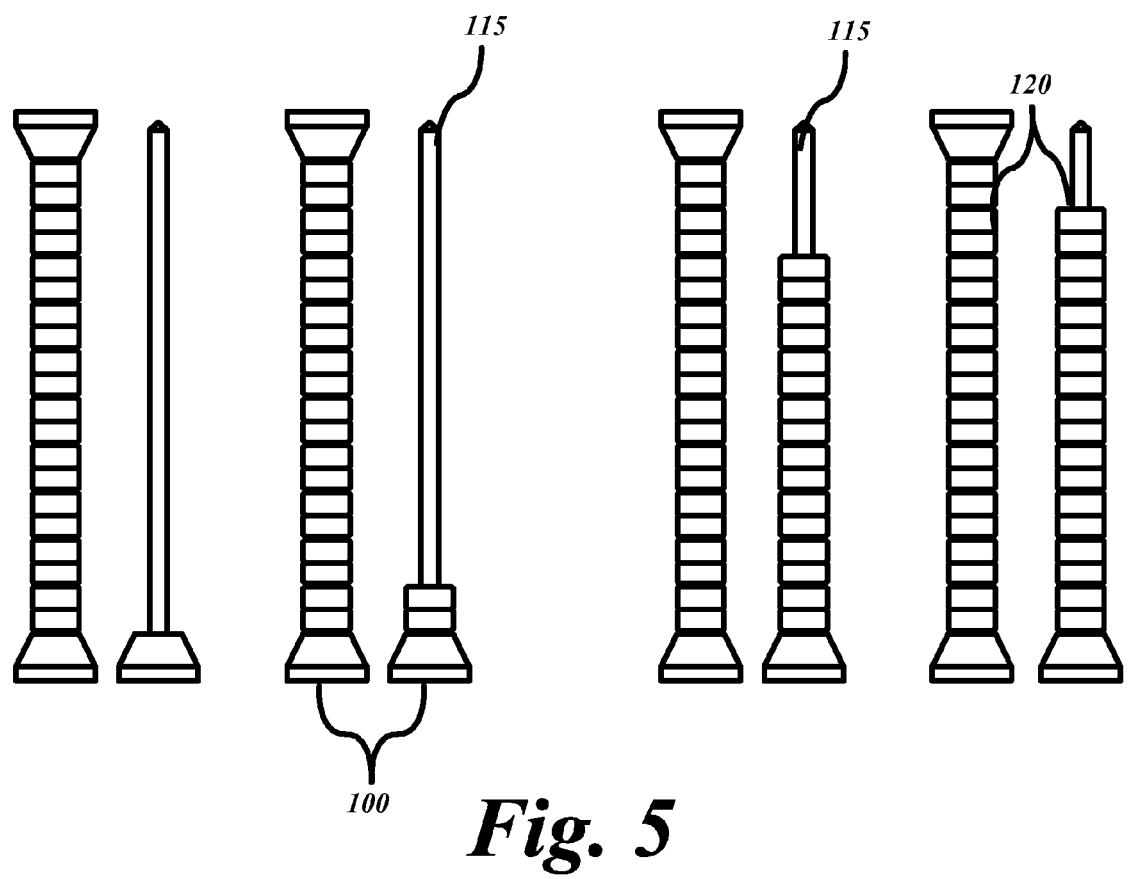

Other numbers may be formed based on basic 10 numbers, 0 through 9. In one embodiment, the one digit number reaches 9 and returns back to 0, thereby forming a pattern. In another embodiment, a second digit, ten, for example, is formed. FIG. 5 shows four two-digit numbers ten, eleven, eighteen, and nineteen, represented in one aspect of the invention.

Figure 6:
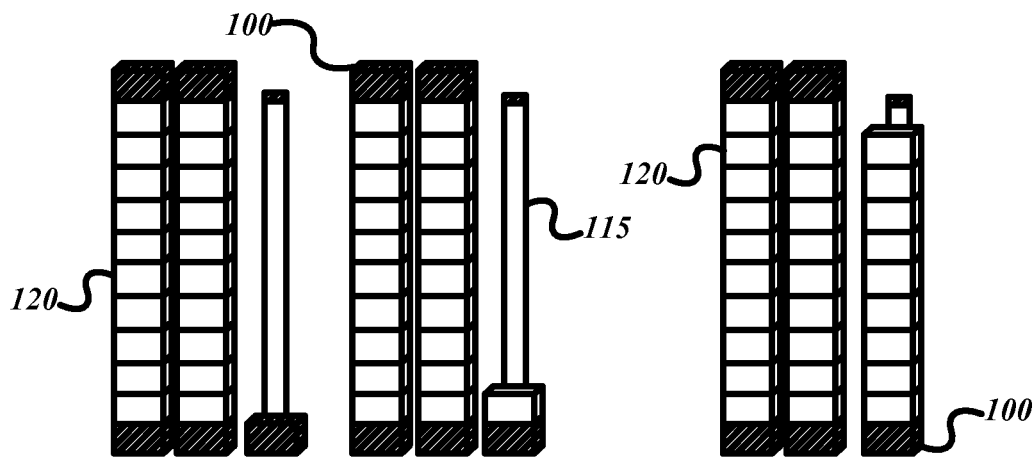

FIG. 6 shows the numbers twenty, twenty-one, and twenty-nine represented by an embodiment of the invention.

Figure 7:
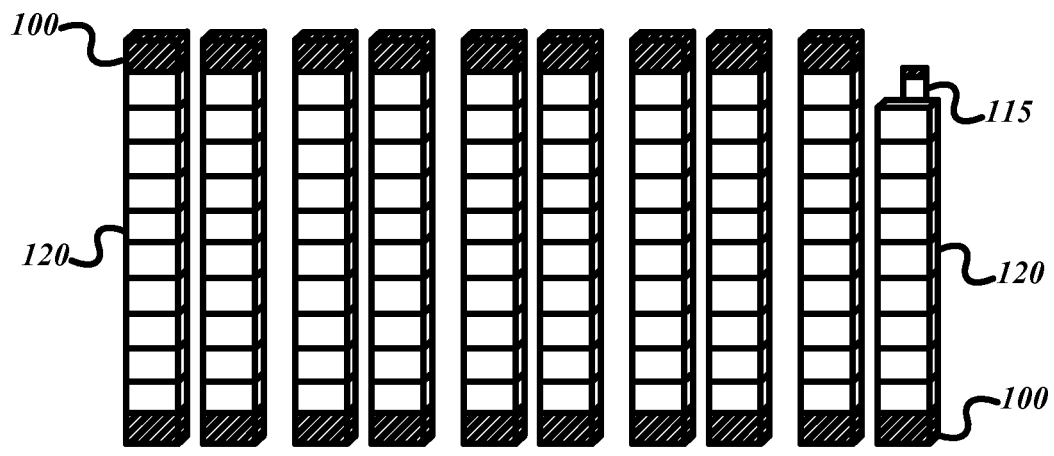

FIG. 7 shows the largest two digit number, ninety-nine, represented by an embodiment of the invention.

Figure 8:
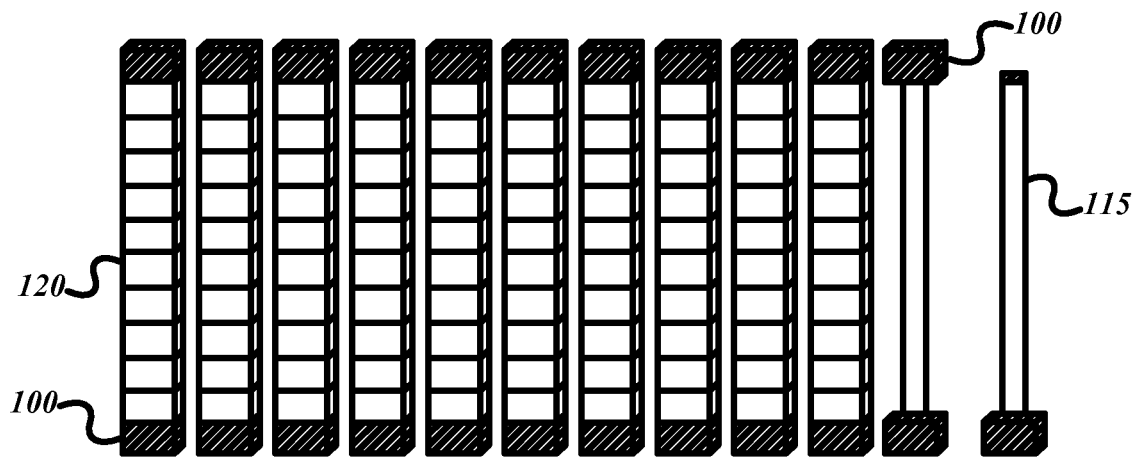

FIG. 8 shows the smallest three digit number, one hundred. One hundred may comprise 1 hundred, zero ten, and zero one. The ten and one pegs 100 may have no cubes 120. Students may work together to form 100. An embodiment may show students what each number looks like. Students may see and build numbers.

Figure 9:
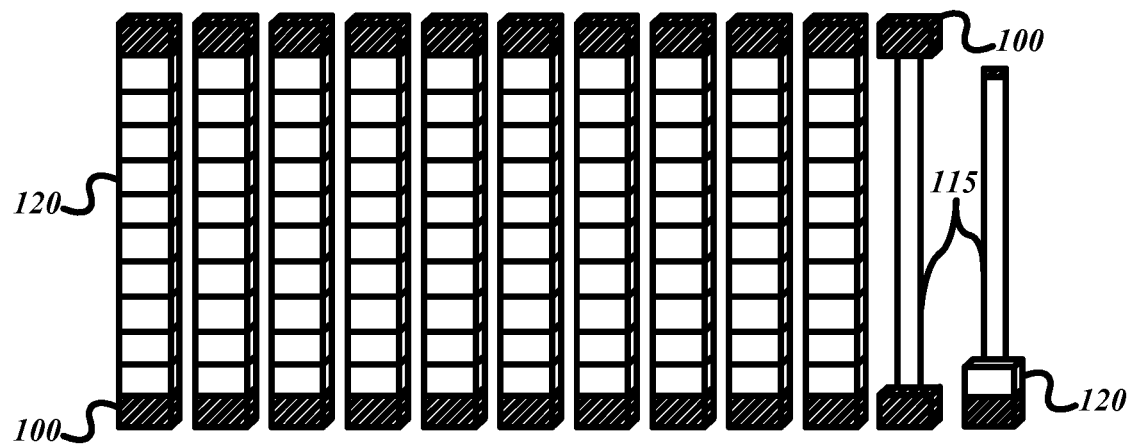

FIG. 9 shows the number one hundred-one. One hundred-one comprises 1 hundred, 0 ten, and 1 one. The pegs 100 may be used as digit holders. Using the pegs 100, students may decide how many cubes 120 to use and what to do to form each number.

Figure 10:
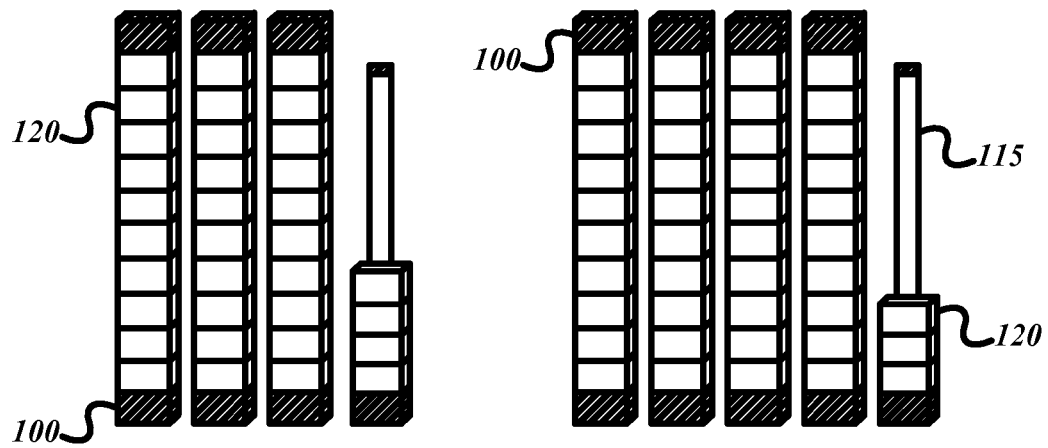

Using an embodiment of the present invention, students may compare numbers. Students may compare numbers using the '>' sign. For example, to compare 34 and 43 students may construct and/or visualize 3 tens and 4 ones in 34 and 4 tens and 3 ones in 43. FIG. 10 shows this comparison.

Still referring to FIG. 10, students may explore other mathematical concepts such as finding the number that succeeds a given number or finding the number that precedes a given number. To find the number that precedes a given number, students may remove a cube 120 from a shaft 115. To find the number that succeeds a given number, students may add a cube 120 to a shaft 115.

Figure 11:
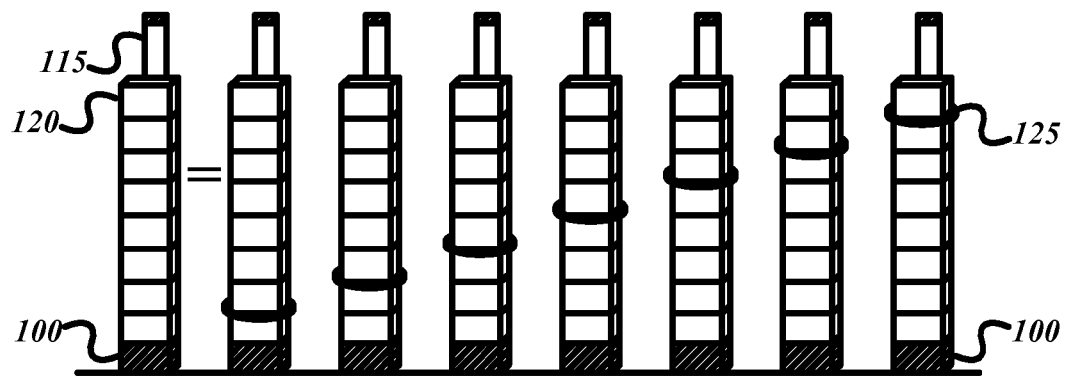

Students may separate a given number into a sum. FIG. 11 illustrates separation of a given number to different sums of two numbers. Using the cubes 120 and pegs 100, students may separate a given number into a sum of two or three numbers swiftly, systematically, and accurately. It will be appreciated, however, that other divisions of numbers may be appropriate, including four, five, etc. Students may predict a definite pattern of different sums. Students may systematically separate the given number into different sum using a divider 125, as shown in FIG. 11.

Cubes 120 and dividers 125 may provide students with a systematic method of separating a given number into different sums, although other suitable configurations for separating may be applicable including rope, twine, and/or wire (not shown). By doing this, students may begin to see that a number may be the sum of several combinations of numbers. For example, the number 8 may be a sum of different combinations of 1 through 7. In one embodiment, students may be taught summation before learning addition. In other embodiments, students may be taught summation and addition simultaneously. This process may decrease the time students may take in learning how to add. For example, students may learn that 8=1+7=7+1=2+6=6+2=3+5=5+3. This may comprise a commutative property that students may learn later in algebra.

Figure 12:
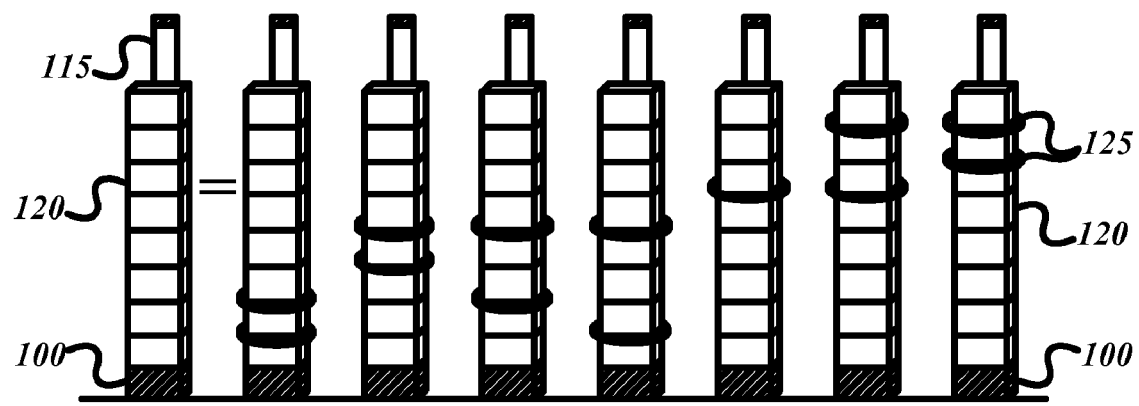

FIG. 12 shows separations of a given number into sums of three different numbers. In one particular embodiment, students may learn that 8=1+1+6=2+1+5=3+1+4=2+2+4=5+2+1=4+2+2=6+1+1. This may also comprise a commutative property that students may learn in algebra. Thus, cubes 120, pegs 100 and dividers 125 may allow students to separate a number into different sums of numbers, although other suitable configurations are applicable. Students may write equations and explore the commutative property further.

Figure 13:
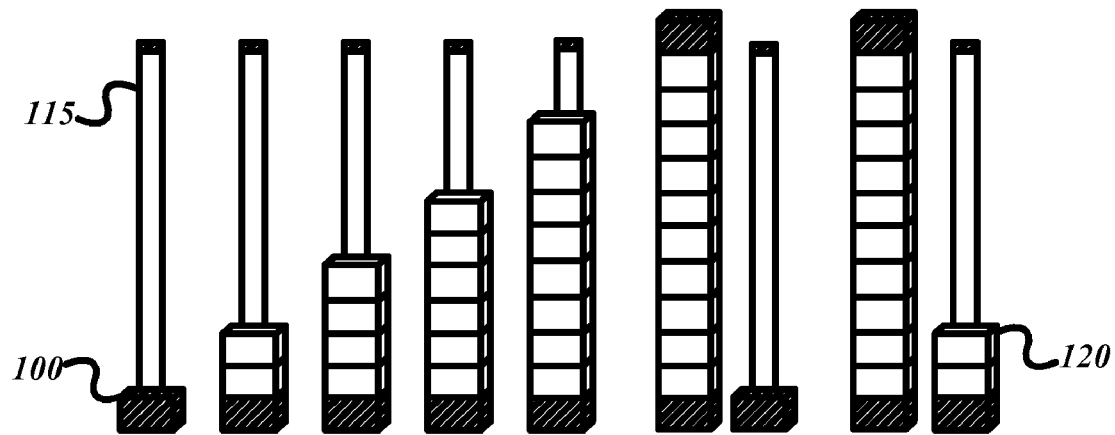

Students may learn to find consecutive odd and even numbers using cubes 120 and dividers. Students may work in groups, discuss and collaborate with each other over the meaning of even numbers and/or how to find the next several consecutive even numbers. Even numbers may be explored beginning with the number zero. Students may determine the next succeeding even number by using cubes 120. Students may be asked to determine what these numbers have in common. Students may be asked to find the next even number. By being asked directed questions, students may discover a pattern in determining even numbers. Students may direct questions at one another or explore questions cooperatively. FIG. 13 shows the numbers zero, two, four, six, eight, ten, and twelve as represented by an embodiment of the present invention.

Figure 14:
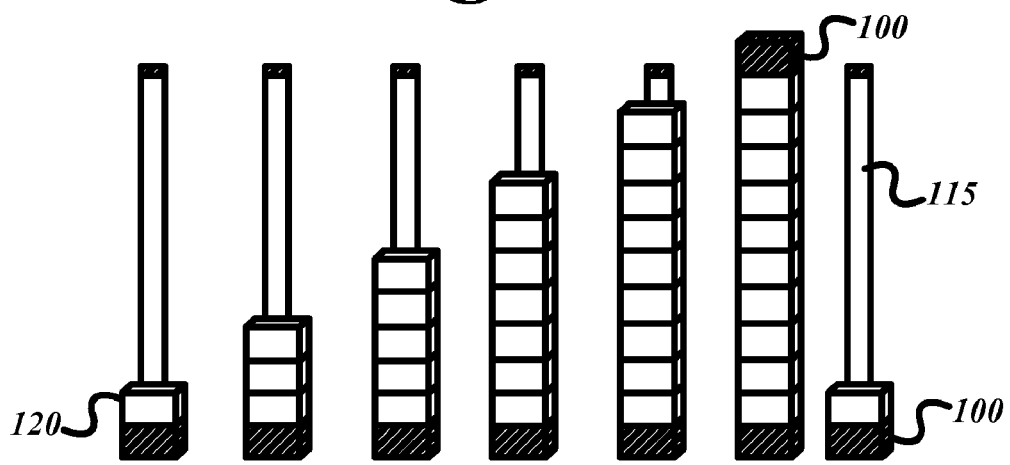

FIG. 14 illustrates odd numbers. A teacher (not shown) may define and/or explain the term "odd numbers", as well as other related mathematical and/or scientific terms. The teacher may begin with the first odd number, 1, illustrated by one cube 120 on a shaft 115, although one will appreciate starting at any odd number and working up or down from there. To find the next odd number, students may add two cubes 120 to the shaft 115. The next several odd numbers 1, 3, 5, 7, 9, 11, etc., may be shown in a similar manner.

Thus, to find the next even or odd number, students may add two cubes 120 to the current number of cubes 120 already on the shaft 115. Students may start with a first even number, add two cubes 120 to the shaft 115 and determine the next even consecutive number, although one will appreciate starting at any even number and working up or down from there. Students may analyze the differences and similarities between even and odd numbers.

Students may explore number theory before moving onto addition. Students may learn to understand number structure and how to manipulate digits before adding and subtracting. Students may think, analyze, compare and evaluate their work and their learning may become authentic and engaging.

Figure 15:
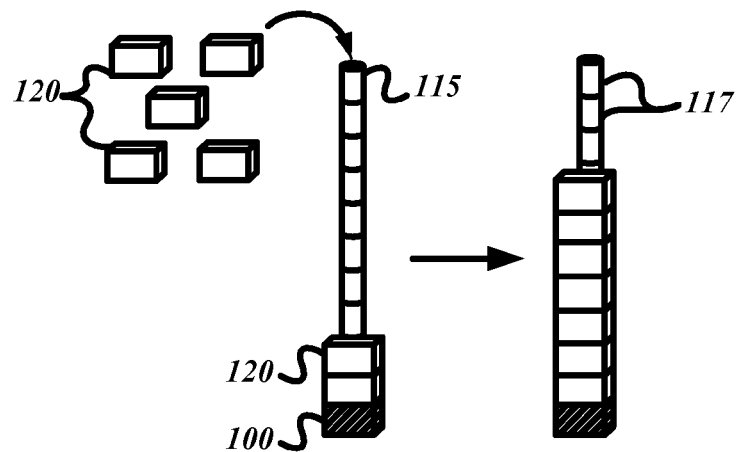
Figure 16:
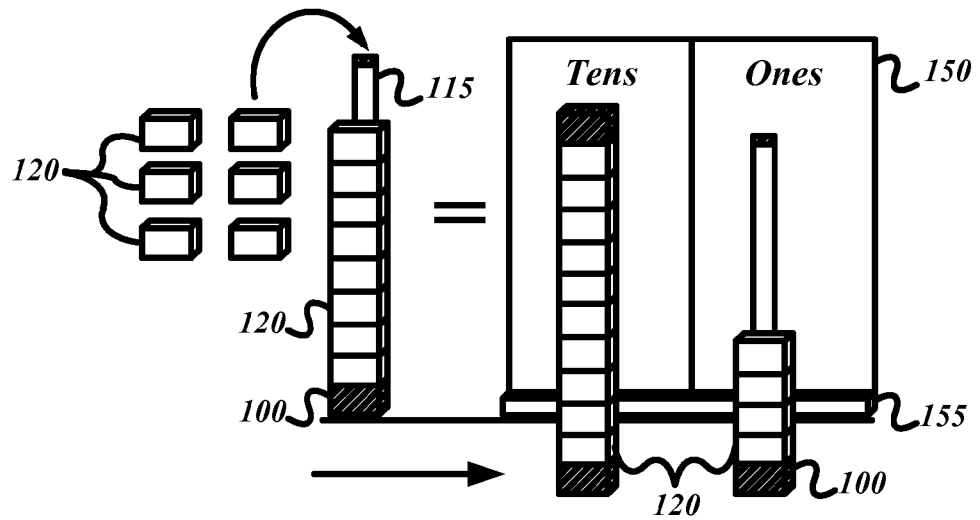

Using an embodiment of the present invention, students may learn addition. By using the cubes 120, students may visualize the process of adding numbers. FIG. 15 shows an example representation of adding two numbers, five and two. Two cubes 120 are placed on the shaft 115 and five more cubes 120 are added. The sum is shown directly on the shaft 115. Further, as shown in FIG. 16, students may add other numbers using the cubes 120 and shafts 115. In one example, students may add six to eight. Because the sum is larger than 10 in this case, students may have to use a peg 100 to enclose the ten cubes 120 on the shaft 115 to make a ten unit 140. One shaft 115 may not be enough because each shaft 115 may only hold ten cubes 120. Students may have to use a second shaft 115 to hold cubes 120 in excess of ten.

Figure 17:
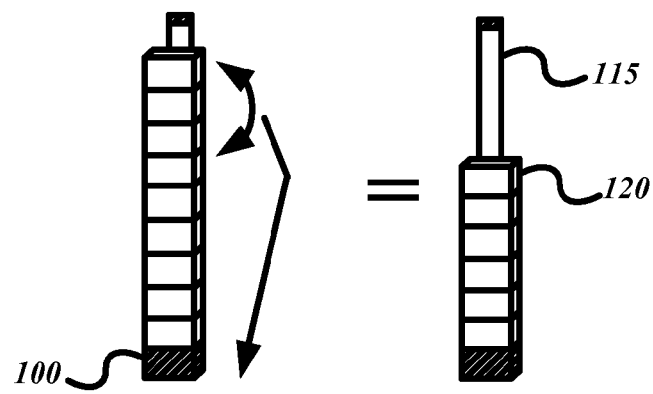

Students may learn subtraction by visualizing the subtraction concept using an embodiment of the present invention. To perform the subtraction, students may remove a number of specified cubes 120 from the existing number of cubes 120 on a shaft 115. The remaining number of cubes 120 left on the shaft 115 is the resultant number. FIG. 17 shows a representation of subtracting three from nine. Students may remove a number of cubes 120 on a given shaft 115. In another example shown in FIGS. 18A-18C, students may subtract but may have to borrow a ten unit 140 because they do not have enough cubes 120 on a given shaft 115.

Traditional methods of teaching and learning multiplication require students to memorize math facts. Students who do not learn basic multiplication math facts may not learn advance multiplication, division, fraction, and/or other advanced mathematical concepts. Math Logic teaching method may provide students with a method to explore multiplication without having to recite the multiplication table. Students may determine a product of a multiplication equation in terms of connection between multiplication and addition. Using cubes 120 and shafts 115, students may learn why the product of $5\times0=0$ and why $4\times3=3\times4$. The student's addition skill may be reinforced during the process of finding each product.

Figure 20:
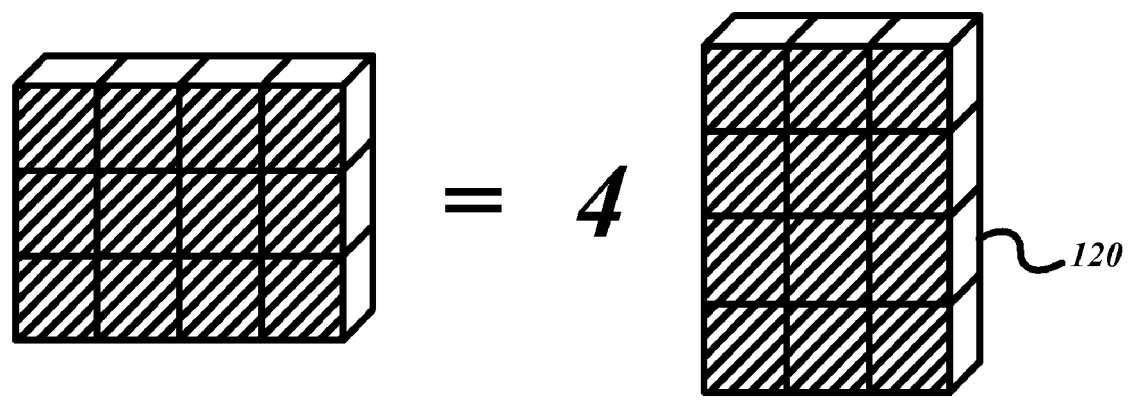

For example, students may be asked to analyze and/or write down a mathematical observation. Their job may be to write some kind of equation to express what they see visually and how they may connect what they see to addition. Students may have to answer questions while going through the analysis phase. For example, they may ask themselves: Is there a pattern here? How many total cubes 120 do I have? How may I write an equation to express the given information? How may I write an equation to show some form of addition here? A sample scenario is illustrated in FIG. 19. Each product $3\times4$ may be represented by cubes 120. The resulting product is the actual number of cubes 120, as illustrated in FIG. 20.

Figure 21:
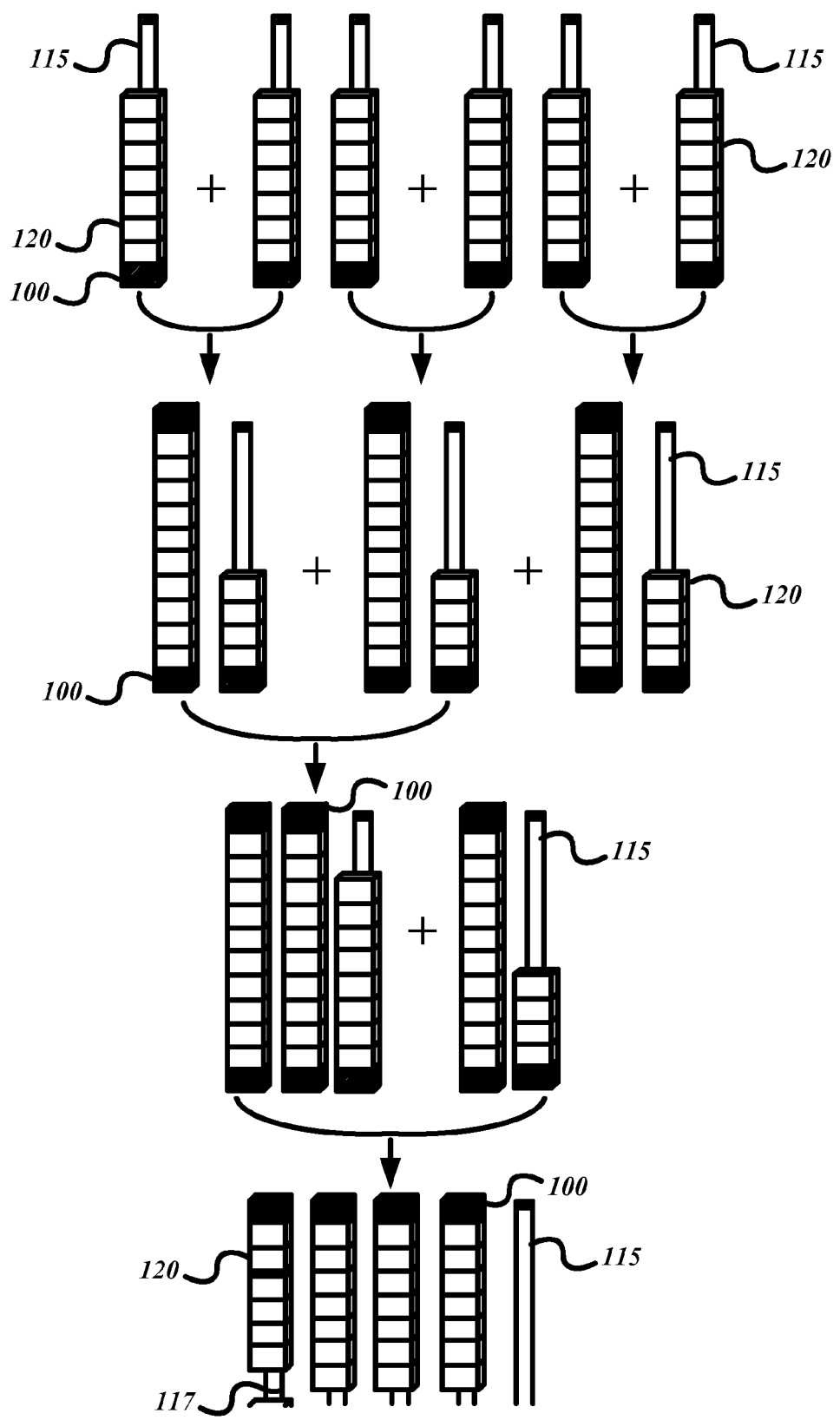
Figure 22:
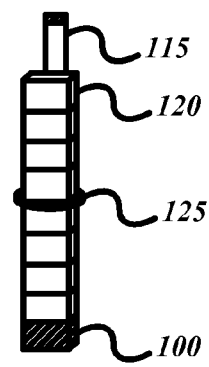
Figure 23A:
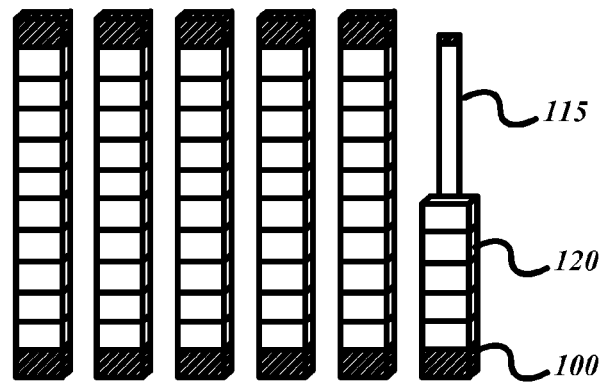
Figure 23B:
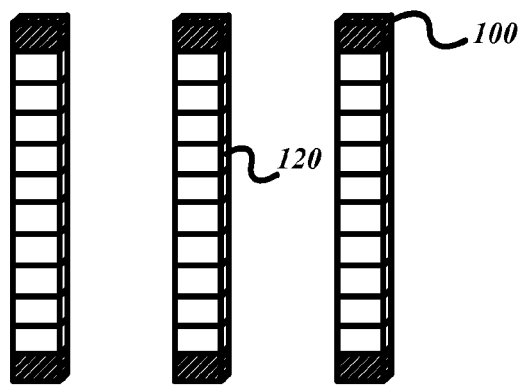
Figure 23C:
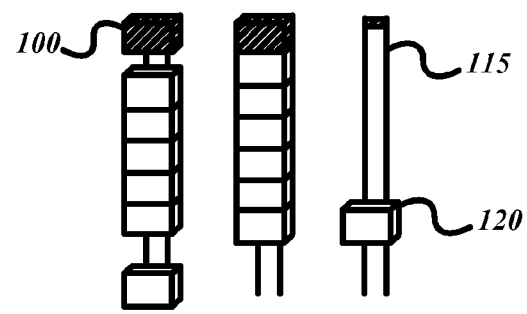

Math Logic may provide students and young children an effective method of finding the answer for each product without memorizing the multiplication tables. Students may learn to add in groups. Young children's addition skill may be reinforced as they try to find the answer for each product, as illustrated in FIG. 21, for example. Students may develop a concept of $6\times7$ as meaning six groups of seven. They may learn to find the answer to a multiplication problem by adding numbers.

Similarly, current methods of teaching and learning division require rote memorization. Students who do not learn these math facts in elementary school may struggle with more advanced mathematical concepts. The Math Logic teaching method may provide students with concrete examples and/or algorithm to perform division. For example, students may be asked to divide 8 by 2. Students may be asked to determine the following equation: $8\div2$. Students may be asked to determine the following equation: $8/2$. As illustrated in FIGS. 22 and 23A-23C, division is the reverse process of multiplication. Students may split a given item of the same kind into groups with the same number of items in each group. To determine the answer, students may have to determine how many cubes 120 in each group.

The present embodiment may be taught to young children beginning at approximately 2½ or 3 years of age but may be appropriate to alternative types of students of any age, including elementary students, English as a second-language students, and/or students with mental disabilities. Students may begin learning numbers using the cubes 120. Students may learn a base 10 whole number system logically and sequentially. They may learn that the number zero is one of the most important numbers of the number system. Students may learn that numbers may be built and constructed from the 10 basic numbers, 0 to 9. The present invention may enable students to compare numbers or to find numbers that precede and/or follow a given number using cubes 120 and shafts 115. Numero Cubes and/or Math Logic may provide students with a method of learning mathematics that is relatively easy, simple, logical, systematic, and accurate. The present embodiment may be taught by a teacher, an instructor, a parent, a sibling, a tutor, and/or by peers. Further, embodiments may be incorporated into a computer software program or written publication. For example, a 3D Numero Cube video game illustrating the principles of the Numero Cube system above could be used to accomplish some of the same purposes. This might be especially helpful for students with motor difficulties or handicaps.

Figure 24A:
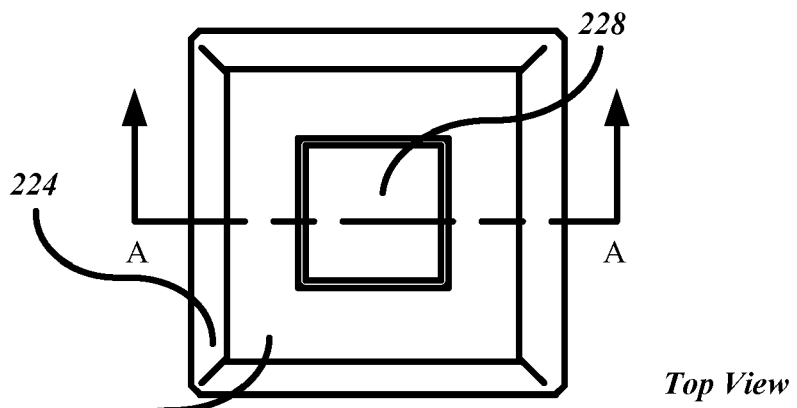
FIG. 24A-C illustrate top, cross-sectional, and bottom views of an alternate embodiment of the numero cube.
Figure 24B:
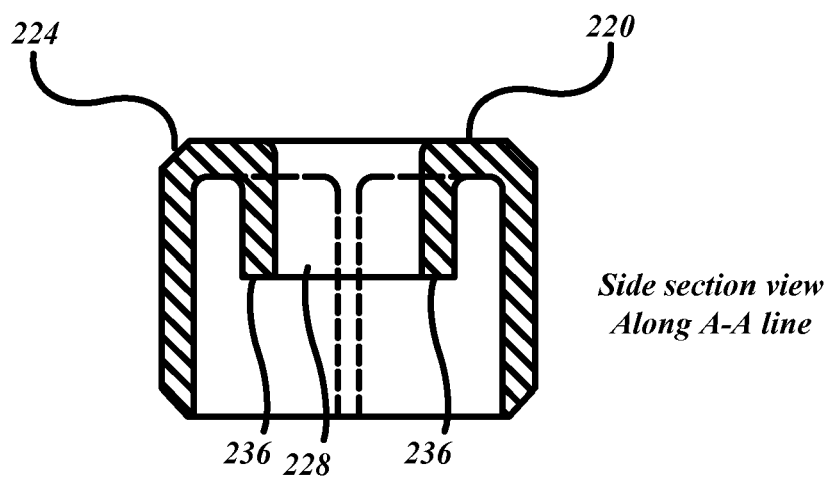
Figure 24C:
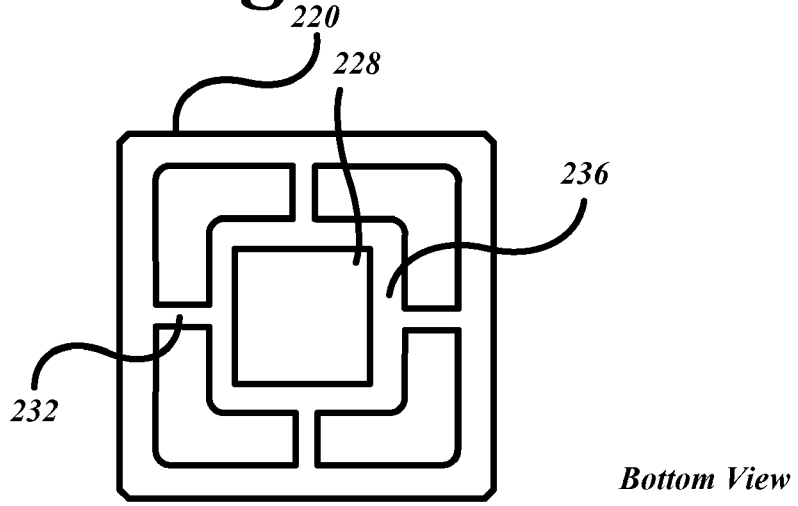

FIG. 24A-C illustrates top, side cross-sectional, and bottom views of an alternate embodiment of the numero cube 220. The numero cube 220 may be made from polystyrene plastics, have a blue color, and exhibit a high polished exterior. It includes an approximate 20 mm by 20 mm top square 220 being circumscribed by a beveled edge 224, and a central square aperture 228 of approximately 7.5 mm by 7.5 mm. The bevel 224 may have a 45-degree taper. FIG. 24B illustrates central walls 236 defining the aperture 228, and side exteriors approximately 13.5 mm deep. FIG. 24C illustrate the central walls 236 defining the square like aperture 228 and secured to the numero cube exterior 220 via stacking ribs 232. The stacking ribs 232 may have a thickness of approximately 1.25 mm aperture and the square aperture 228 may be approximately 7.5 mm wide. The length of the central walls 236 may be approximately 7.5 mm.

Figure 25A:
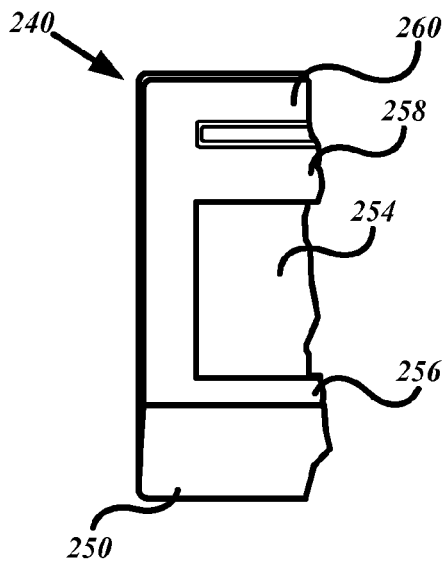
FIG. 25A-F illustrate partial top, cross-sectional, and partial bottom views of an alternate embodiment of the numero cube base.
Figure 25B:
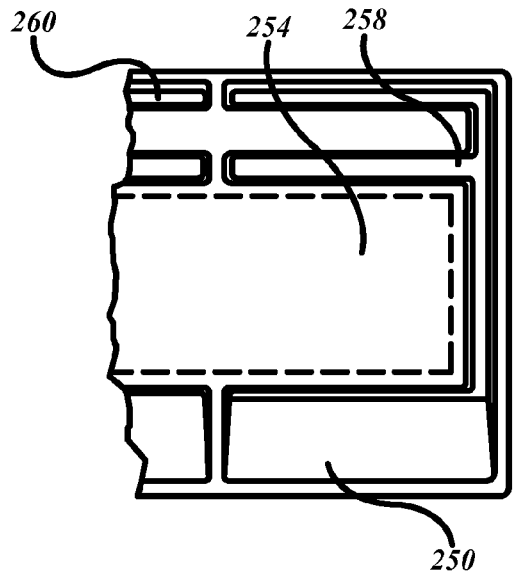
Figure 25C:
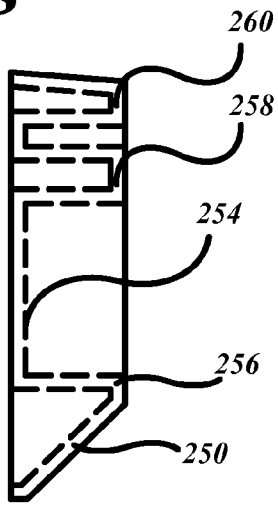
Figure 25D:
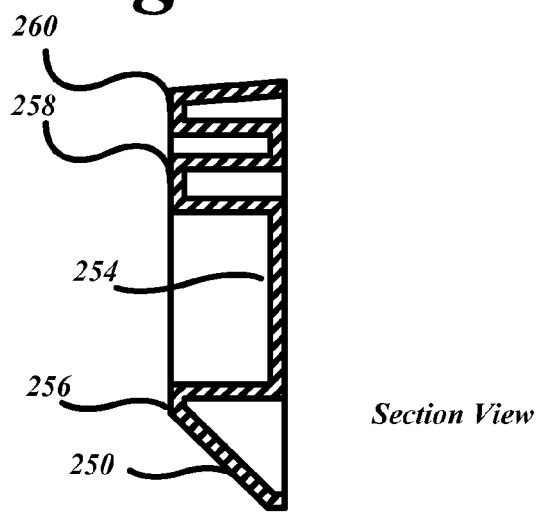
Figure 25E:
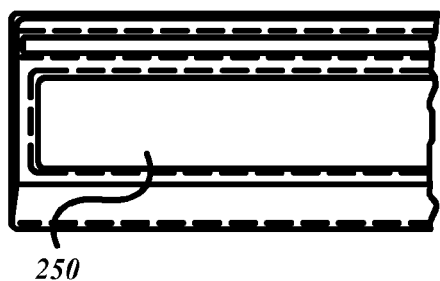
Figure 25F:
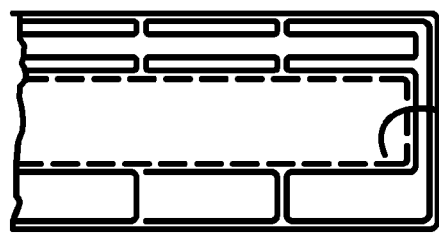

FIG. 25A-F illustrates partial top, cross-sectional side view, and bottom views of an alternate embodiment of the numero cube base 240. FIG. 25A illustrates a top view of a portion of the numero cube base 240 having a base slant 250, stiffing ribs 256, 258, and 260 and a magnet reservoir 254 located between the stiffening ribs 256 and 258. The magnet reservoir is dimensioned to receive a 28 mm wide, 280 mm long, and 1.6 mm adhesive fastened magnetic strip illustrated in FIG. 28 below. FIG. 25B illustrates a bottom of a portion of the numero cube base 240. FIG. 25C is an end view of the numero cube base 240. The width the numero cube base 240 may be 75 mm and the width of the magnet reservoir 254 may be 31 mm with an inside clearance of 30.5 mm and have a depth of approximately 17 mm. Stiffening ribs 256 and 260 may be 5 mm wide, and stiffening rib 258 may be 10 mm wide. FIG. 25D illustrates a cross-section view of the numero cube base 240. The wall thickness may be 3 mm. FIGS. 25E and 25F present alternate top and bottom views of a portion of the numero cube base 240.

FIG. 26A-B illustrates side, and top views of alternate embodiments of the peg and peg base. FIG. 26A illustrates a side view of a peg base 300 in which a peg 320 is inserted. Section line B-B sows a cross-sectional view of the peg 320. FIG. 26B illustrates a larger cross-sectional view of the peg 320. In a particular embodiment, the base 300 may be square shaped with sides of approximately 27.5 mm. The peg 320 may have a length of approximately 173 mm and be made of molded, clear plastic and colored with varying hues. The peg 320 is cross-shaped and may have be approximately 6.5 mm wide with stubby arms of approximately 2.5 mm.

FIG. 27A-D illustrates additional views of the peg base 300. FIG. 27A is a cross-sectional view of the peg base 300 that illustrates peg base cavity 310 having dimensions of approximately 21.5 mm wide and 5 mm high, with an approximately 45 degree internal bevel, and contained with a substantially square configuration having a side 304 of approximately 27.5 mm. The peg base cavity 310 may be configured to receive an adhesive mounted iron pierce to provide a supporting anchor weight or magnetic iron piece to secure the inserted peg 320. The peg base 300 includes a shaft extension 306 of approximately 2.5 mm thick defining a peg holder cavity 308 of approximately 8.8 mm deep and wide enough to securely hold the 6.5 mm wide peg 320. FIG. 27B is a top view of the peg base 300 illustrating the shaft extension 306 having a diamond shape in which the peg holder cavity 308 presents an octagonal configuration within the shaft extension 306. Near the center of the peg holder cavity is a chamfered hole 312. The dashed square delineates the peg base cavity 310 residing within the side 304 by side 304. Rounded corners may occupy the separation between the sides 304. Extending from the diamond shape shaft extension 306 are four support braces 316, each separated by approximately 90 degrees. FIG. 27C is a side view of FIG. 27B. FIG. 27D is an auxiliary view and shows the constricted passageway of the chamfered hole 312 between the peg base cavity 310 and the peg holder cavity 308.

FIG. 28 illustrates a magnet insert 370 that occupies the magnet reservoir 254 shown in FIGS. 25A-F. Dimensions may be approximately 25 mm by 280 mm. Thickness may be 1.6 mm.

FIGS. 29A-B illustrates orthographic views of an iron insert 375 placeable within the peg base cavity 310 of the peg base 300 for detachable magnetic or removable binding with the magnet insert 370 occupying the magnet reservoir 254 of the numero cube base 240. FIG. 29A presents a side view having a thickness of approximately 0.5 mm and FIG. 29B presents a top view of the iron insert 375 have a substantially square configuration with a side dimension of approximately 21 mm. The Iron insert 375 is magnetically attractive, smooth, and posses a substantially clean surface to receive an adhesive derived of ethyl benzene, xylene, or petroleum naphtha for affixing within the peg base cavity 310.

Figure 30A:
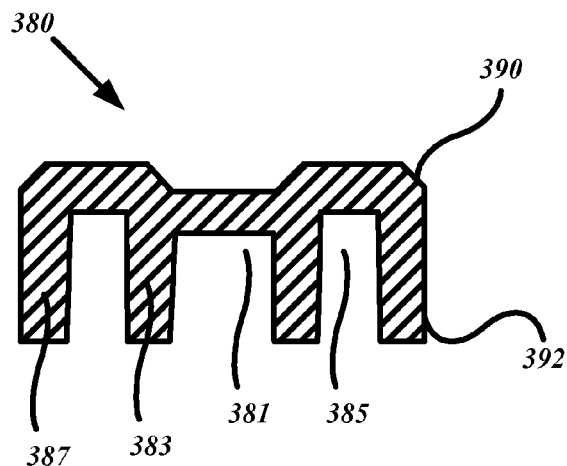
FIGS. 30A-C illustrate cross-sectional, side, and bottom views of an alternate embodiment of a top cap.
Figure 30B:
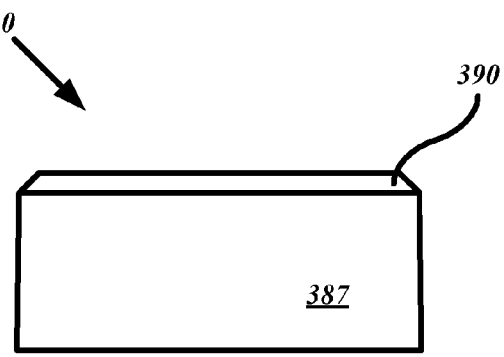
Figure 30C:
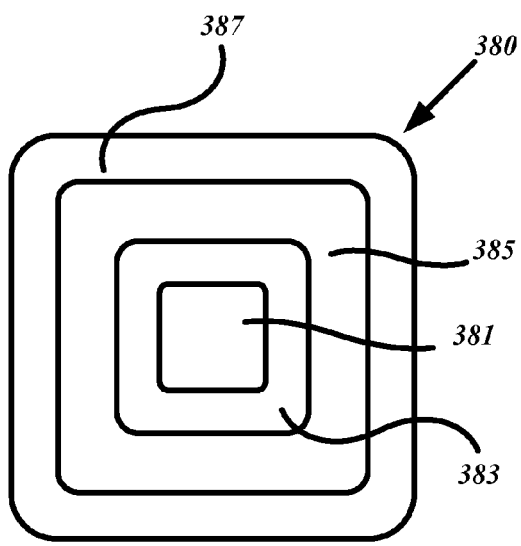

FIGS. 30A-C illustrate cross-sectional, side, and bottom views of an alternate embodiment of a top cap 380. FIG. 30A is a cross-sectional view of the top cap 380 illustrating an inner cavity 381 that is substantially square shaped defined by an inner wall 383 and an outer cavity 385 concentric about the inner cavity 381 that is substantially square shaped and defined by an outer wall 387. The inner and outer walls 385 and 387 are approximately 3 mm thick. The height of the inner cavity 381 is approximately 7.5 mm and the height of the outer cavity 385 is approximately 8.75 mm. The substantially square shaped top cap 380 is approximately 27.5 mm by 27.5 mm. A bevel 390 extends along the top edge of the top cap 380. FIG. 30B presents a side view of the top cap 380 showing the outer wall 387 and bevel 390. FIG. 30C presents a bottom view that correlates to the cross sectional view of the top cap 380. The inner cavity 381 engages with the top portion of the peg 320.

Figure 31A:
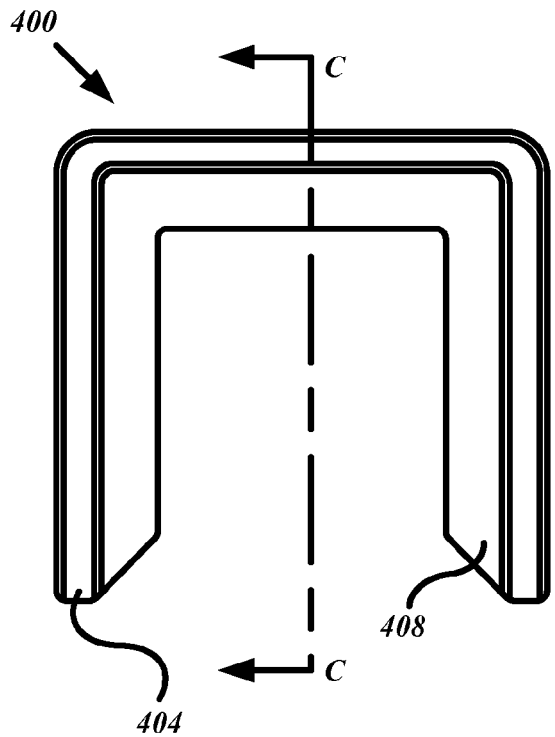
FIGS. 31A-C illustrate orthographic views of an alternate embodiment of a number separator.
Figure 31B:
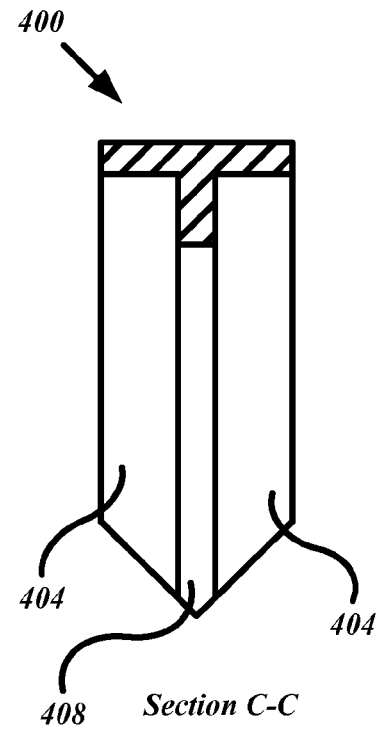
Figure 31C:
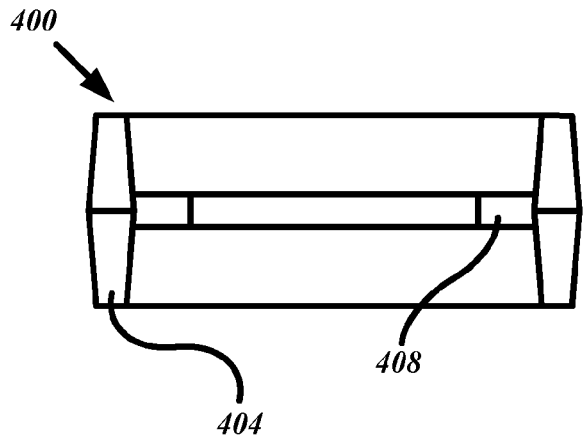

FIGS. 31A-C illustrate orthographic views of an alternate embodiment of a number separator 400. The number separator 400 may be made of polished plastic, clear, and have a red color or other colors and is substantially an open square having three sides of approximately 25 mm. FIG. 31A illustrates a top view showing an outer edge 404 having a double wedge configuration surrounding a beveled slant 408. FIG. 31B illustrates a side cross-sectional view along the lines C-C of FIG. 31A and shows the surfaces of the outer edge 404 in relation to the more centrally located beveled slant 408. FIG. 31C is a side view locking at the opening of the number separator 400 and illustrates the position of the outer edge 404 in relation to the beveled slant 408. The beveled slant 408 may present a 45 degree taper and the thickness may be 2 mm. The inner distance separating the inner edges of the beveled slant may be approximately 15 mm.

While the preferred embodiment of the invention has been illustrated and described, as noted above, many changes may be made without departing from the spirit and scope of the invention. Accordingly, the scope of the invention is not limited by the disclosure of the preferred embodiment.

I claim:

1. A system to teach mathematics of the base 10 number system comprising:
   at least one peg defining a receptacle, the position of the receptacle signifying an increment of 10;
   at least one shaft sized so that an end of the at least one shaft may be inserted into the receptacle;
   at least one cube defining a sleeve sized to allow the at least one shaft to be inserted through the sleeve, the at least one cube signifying a unit value;
   at least one divider defining an open slot, the slot sized to allow the at least one shaft to fit into the slot;
   at least one tray defining a peg receptacle, the peg receptacle sized to allow insertion of at least one peg into the peg receptacle, and
   wherein manipulation of the cube, the at least one shaft, the at least one divider, and the at least one peg are configured to represent values of whole numbers of the base 10 number system.

2. The system of claim 1, wherein the at least one peg includes a first magnet and the at least one tray includes a second magnet.

3. The system of claim 1, wherein the shaft is further sized such that the shaft may be inserted through ten cube sleeves and each end of the shaft may be inserted into a peg receptacle, and wherein the cubes may be securely held on the shaft between the pegs.

4. The system of claim 1, further including:
   a placement panel and a slotted panel tray, the panel tray slot sized to allow insertion of the panel.

5. A system to teach mathematics of the base 10 number system comprising:
   at least one peg defining a receptacle, the position of the receptacle signifying an increment of 10;
   at least one shaft sized so that an end of the at least one shaft may be inserted into the receptacle;
   at least one cube defining a sleeve sized to allow the at least one shaft to be inserted through the sleeve, the at least one cube signifying a unit value;
   at least one divider defining an open slot, the slot sized to allow the at least one shaft to fit into the slot; and
   at least one tray defining a peg receptacle, the peg receptacle sized to allow insertion of at least one peg into the peg receptacle,
   wherein manipulation of the at least one cube, the at least one shaft, the at least one divider, and the at least one peg signify mathematical operations of the base 10 number system.

6. The system of claim 5, further including:
   migration of the cube between the peg signifies at least one of a subtraction operation and an addition operation.

7. A method to teach mathematics of the base 10 number system comprising:
   obtaining at least one peg defining a receptacle, the position of the receptacle signifying an increment of 10;
   placing at least one shaft sized so that an end of the at least one shaft may be inserted into the receptacle;
   obtaining at least one cube defining a sleeve sized to allow the at least one shaft to be inserted through the sleeve, the at least one cube signifying a unit value;
   placing at least one divider defining an open slot, the slot sized to allow the at least one shaft to fit into the slot;
   obtaining at least one tray defining a peg receptacle, the peg receptacle sized to allow insertion of at least one peg into the peg receptacle, and
   manipulating the cube, the shaft, the divider, and the peg to execute mathematical operations of the base 10 number system.

8. The method of claim 7, wherein manipulating comprises moving the cube to the at least one peg signifies an addition operation and moving the cube from the at least one peg signifies a subtraction operation.

9. The method of claim 7, wherein manipulating comprises removing the cube from the at least one peg to be without any cubes signifies the number zero for the at least one peg.

* * * * *